United States Patent [19]
Green et al.

[11] Patent Number: 5,954,791
[45] Date of Patent: Sep. 21, 1999

[54] MULTIPLIERS WITH A SHORTER RUN TIME

[75] Inventors: Jörg-Michael Green, München; Oliver Salomon, Unterhaching, both of Germany

[73] Assignee: Siemens Aktiengesellschaft, Munich, Germany

[21] Appl. No.: 08/716,439

[22] PCT Filed: Mar. 21, 1995

[86] PCT No.: PCT/DE95/00385

§ 371 Date: Sep. 23, 1996

§ 102(e) Date: Sep. 23, 1996

[87] PCT Pub. No.: WO95/25998

PCT Pub. Date: Sep. 28, 1995

[30] Foreign Application Priority Data

Mar. 21, 1994 [DE] Germany .............................. 44 09 613
Sep. 12, 1994 [DE] Germany .............................. 44 32 432
Sep. 12, 1994 [DE] Germany .............................. 44 32 425

[51] Int. Cl.$^6$ ..................................................... G06F 7/52
[52] U.S. Cl. ............................................................ 708/625
[58] Field of Search ............................... 364/757, 754.01, 364/758, 760.01–760.03, 748.09

[56] References Cited

U.S. PATENT DOCUMENTS 4,748,584  5/1988  Noda .................................. 364/760.03
4,910,701  3/1990  Gibbons et al. .................... 364/760.03
5,262,976 11/1993  Young et al. ....................... 364/760.01

OTHER PUBLICATIONS

Henlin et al., "A 16 Bit×16 Bit Pipelined Multiplier Macrocell", IEEE Journal of Solid–State Circuits, vol. SC–20, No. 2, Apr. 1985, pp. 542–547.

Klar, "Integrierte Digitale Schaltungen MOS/BICMOS", Springer–Verlag 1993, pp. 228–232.

Baugh et al., member, IEEE, "A Two's Complement Parallel Array Multiplication Algorithm", IEEE Transactions on Computers, vol. C–22, No. 12, Dec. 1973, pp. 1045–1047.

R. Roncella et al., "Application of a Systolic Macrocell-–Based VLSI Design Style to the Design of a Single–Chip High–Performance Fir Filter", IEEE Proceedings–G, vol. 138, No. 1, Feb. 1991, pp. 17–21.

Vassiliadis et al., member IEEE, "Hard–Wired Multipliers with Encoded Partial Products", IEEE Transactions on Computers, vol. 40, No. 11, Nov. 1991, pp. 1181–1197.

Sunder, "A Fast Multiplier Based on the Modified Booth Algorithm", Inter. Journal of Electronics, 1993, vol. 75, No. 2, pp. 199–208.

Electronics Letters, Aug. 16th, 1990, vol. 26, No. 17, pp. 1413–1415.

Electronics Letters, Sep. 25th, 1986, vol. 22, No. 20, pp. 1061–1062.

*Primary Examiner*—Emmanuel L. Moise
*Attorney, Agent, or Firm*—Hill & Simpson

[57] ABSTRACT

A multiplication circuit for binary coded numbers uses rows of adders and multipliers for parallel computation. Sign bit supplementation is used in which sign bits are supplemented by binary digits in the rows of adders. In particular, the required addition of the sign bit first occurs in the first multiplier row where elements representing simple loads are used in place of adders with inputs that represent multiple input loads. Wiring simplification also is applied in the higher order adders of subsequent adder rows. Circuit simplification is achieved by replacing half adders with inverters.

19 Claims, 19 Drawing Sheets

MULTIPLIERS WITH A SHORTER RUN TIME

BACKGROUND OF THE INVENTION

1. Field of the Invention

The present invention relates to simplified multipliers for binary coded numbers which have shorter run times than known multipliers.

2. Description of the Related Art

Various multiplier structures are known for the purpose of multiplying binary coded numbers. Both serial-operating and parallel-operating multiplier methods are applied. It is possible, for example, to use as a 4-quadrant multiplier a field multiplier whose algorithm is described in the journal 'IEEE Transactions on Computers', Vol. C-22, No. 12, December 1973, pages 1045 to 1047, or a BOOTH multiplier such as is described in 'Integrierte digitale Schaltungen' ['Integrated digital circuits'] by Klar, Springer Verlag 1993, pages 228 to 232.

The BOOTH multiplier represented uses carry-ripple logic. In addition to positive numbers, the 4-quadrant multipliers can also process negative numbers in the form of two's complements. If, for example, a BOOTH multiplier is designed using carry-save logic in order to shorten the run time, the sign bit must be supplemented in the individual stages by at least two further bit positions which are fed to inputs of half-adders or full adders of the following adding stage.

For example, by multiplying the multiplicand by, in each case, one bit of the multiplier factor, partial products are formed of which firstly the lowest-order are added. A further partial product in then respectively added to the partial product subtotal formed.

A basic rule in adding numbers in two's complement representations requires that in the case of multipliers (adders) designed using carry-save technology the sign bits (which are the highest-order bits) are supplemented as far as the highest significance of the highest-order summand or partial product. This means, in turn, that each sign bit in the individual adder rows must be led to the inputs of further adders.

In the case of multipliers using carry-ripple technology, too, by multiplying the multiplicand by, in each case one bit of the multiplier factor partial products are formed of which likewise initially the lowest-order are added using carry-ripple technology. A further partial product is then likewise respectively added to the partial product subtotal formed.

The corresponding basic rule for adding numbers in a two's complement representation also requires that the sign bits (which are the highest-order bits) are supplemented up to the highest significance of the expected sum in the case of multipliers (adders) designed using carry-ripple technology. This means that each sign bit must be led to an input of at least one further adder.

The run time is substantially lengthened in all types of multiplier, particularly by the capacitive loading owing to further adder inputs.

A method of simplification in the case of supplementing the sign bits of Booth multipliers, which is designed in accordance with FIG. 4 using full adders, is specified in the publication "Electronics Letters", Sep. 25, 1986, Vol. 22, No. 20, page 1061 to 1062. However, there are no details on further circuit simplification. It is further mentioned that the method is not limited to Booth multipliers. However, its application does not lead to an optimum result in the case of other types of multiplier.

SUMMARY OF THE INVENTION

It is an object of the invention to specify multipliers with a simpler design and reduced run time.

This and other objects and advantages of the invention are achieved by a multiplier having a matrix-shaped circuit arrangement of a plurality of adder rows in which the sign bits of partial products or their subtotals are supplemented by at least one binary digit, by the sign bit to be supplemented being fed inverted to an adder of the next adder row and in addition a one being added in this adder, and in that instead of the sign bit a constant one is added in each case in the higher-order adders of the same adder row, characterized in that the lowest-order full adder of the first adder row, which combines two sign bits of two partial products, is fed the sign bits inverted and in that the highest-order adder of the same adder row is constructed as a half-adder.

A particular advantage of this multiplier is its reduced run time. Moreover, however, the circuit arrangement is also simplified, and the layout area and the power consumption are reduced.

It is possible in the case of all multiplier types to apply the principle of sign bit supplementation or sign bit correction, the structure of which requires the sign bits to be supplemented by one or more binary digits, for example by parallel computation of subtotals.

A particular advantage of the multiplier designed using carry-save logic is the reduced run time, which is achieved, on the one hand, by the parallel addition of the three lowest-order partial products and, on the other hand, by the reduction in the adder inputs to be driven.

A multiplier using carry-ripple technology renders a final adder superfluous. The run time is reduced by the sign bit supplementation. Moreover, the circuit arrangement is further simplified, and the layout area and the power consumption are reduced.

Considerable circuit simplifications are already produced in a conventional field multiplier. These advantages naturally become even greater in the case of "parallel-operating" field multipliers with sign bit supplementation comprising a plurality of bits.

A further advantageous circuit simplification can be produced by, in each case replacing by an inverter half-adders one input of which is fed a one (logic 1). By contrast with an adder input, the capacitive and ohmic loading by an inverter input is virtually negligible, and the structure is further simplified.

A further reduction in run time is achieved by replacing by inverters full adders which are fed inverted input signals.

A further advantageous circuit simplification can be produced owing to the fact that it is possible to omit series circuits of, in each case, one half-adder and one inverter.

Of course, multipliers can also be designed in mixed forms of carry-ripple and carry-save technology.

The principle employed in multipliers can, of course, also be employed for adding circuits. The latter correspond to a simplified trivial multiplier which processes only summands instead of partial products.

BRIEF DESCRIPTION OF THE DRAWINGS

Exemplary embodiments of the invention are explained in more detail with the aid of figures, in which.

DETAILED DESCRIPTION OF THE PREFERRED EMBODIMENTS

The principles of the sign expansion and circuit simplification are to be explained in more detail with reference to the BOOTH multiplier.

A detail of the logic diagram of a BOOTH multiplier using carry-ripple arithmetic is represented in detail on page 231 of the book 'Integrierte digitale Schaltungen' ['Integrated Digital Circuits'] mentioned at the beginning. It is seen that in each case the first and last BOOTH multiplexer can be designed more simply. The sign inversion is displaced into the adders.

Figure 2:
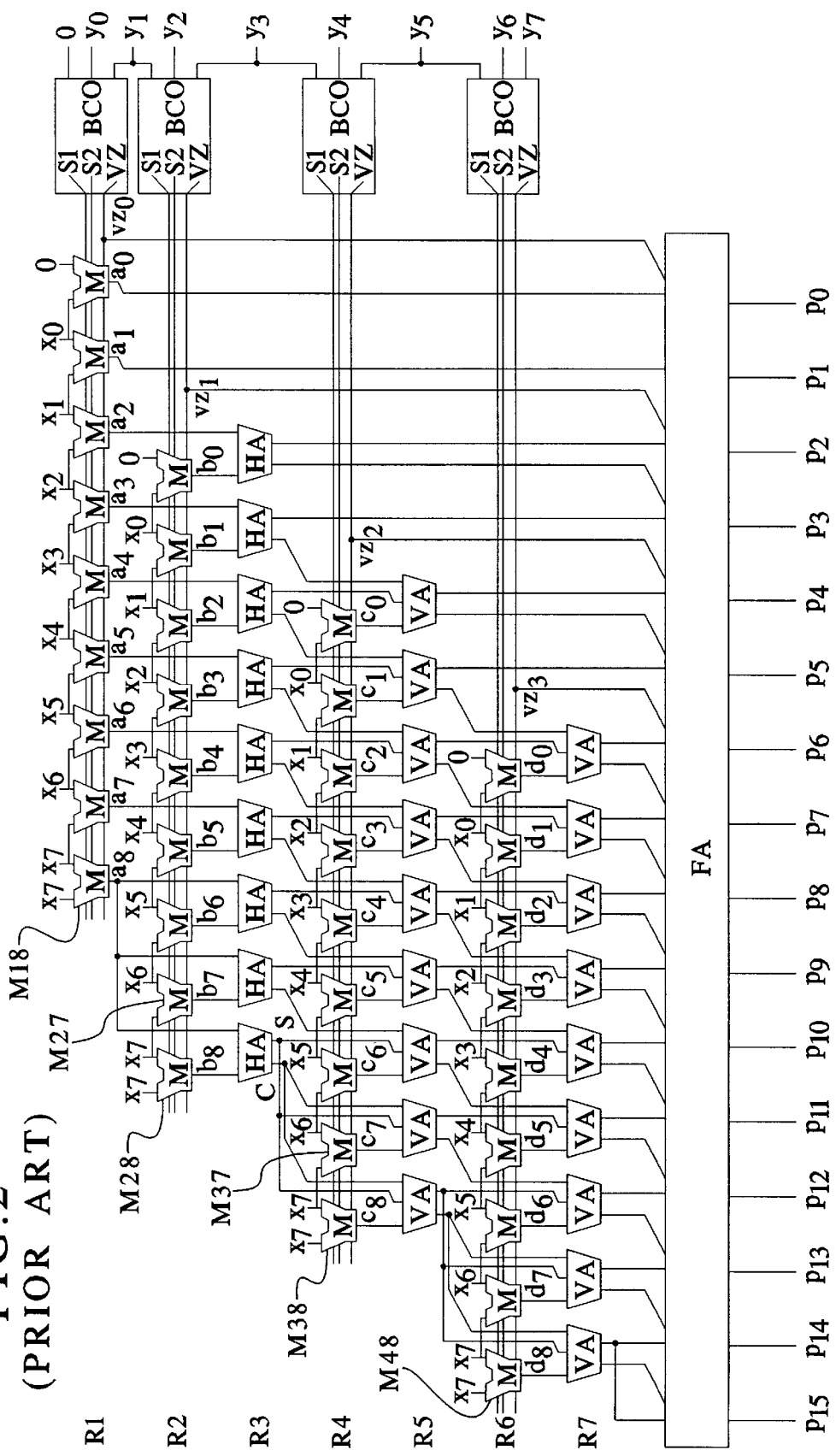
FIG. 2 shows a customary BOOTH multiplier.

In the regular arrangement of a known 4-quadrant BOOTH multiplier according to FIG. 2, the sum of the partial products is determined in circuits structured as uniformly as possible (for example see the publication IEEE Journal of Solid-State Circuits, Vol. SC-20, No. 2, April 1985, pages 542 to 546). The BOOTH multiplier contains in the upper region two rows R1 and R2 of BOOTH multiplexers M. A row R3 of (in essence) half-adders HA follows. Then, the latter are followed alternately by rows R4, R6 of BOOTH multiplexers M and rows of full adders VA R5 and R7. The circuit was implemented using carry-save arithmetic in essence. The multiplier factor $y_8 \ldots y_0$ is converted in BOOTH coders BCO into so-called BOOTH coefficients (BOOTH control signals) VZ, S1, S2, which serve as control signals for the BOOTH multiplexers.

In order to achieve correct sign processing, in the known circuit the sign bit $a_8$ firstly has to be supplemented as far as the highest significance of the following partial product. In the same way the carry bits C and the sum bits S of the highest-order adder cells must respectively be supplemented as far as the highest significance of the following partial product.

This has the consequence that the output of the 'highest-order' BOOTH multiplexer M18 (that arranged furthest left) must be connected to the inputs of three half-adders. Likewise, the sum-bit and carry-bit outputs of the highest-order half-adders of row R3 and of the full adders of row R5 are connected for the purpose of sign supplementation respectively to inputs of three full adders of the following adder row. The increased (capacitive) loading of the output has a disadvantageous effect on the delay times in all logic families.

The calculation of the product sum is performed in several stages, the sum of the partial products $a_8, a_7, a_6, \ldots a_0$; $b_8$, $b_7, b_6, \ldots b_0$; $c_8, c_7, \ldots$ being formed successively. The partial product formed in each row is added in the half-adders HA or full adders VA to the partial product subtotal already formed in the previous rows, sum bits S and carry bits C of the subtotal being led to the following adder row.

The highest-order bit of a partial product specifies the respective sign. To correctly process the sign, the sign bits must likewise be extended as far as the highest significance of the following partial product.

In a final adder FA (FIG. 5), the final product is calculated from the BOOTH coefficients VZ, the partial product bits, which are not further cascaded, and the subtotal bits. In the multipliers implemented, circuit principles with the shortest possible run times are employed for the final adder; the final adder represented serves only to explain the function.

Figure 1:
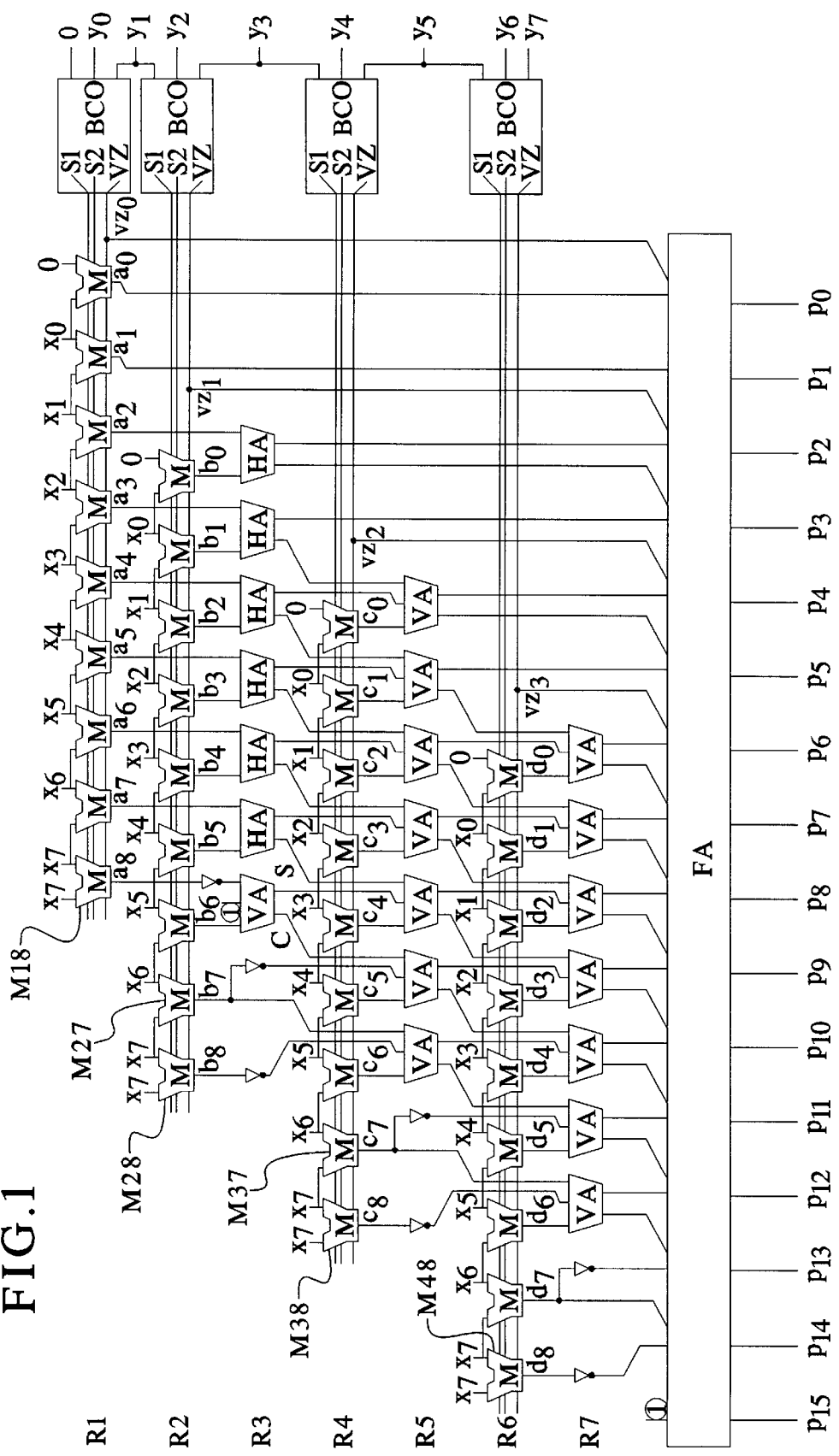
FIG. 1 shows an advantageous BOOTH multiplier

By contrast with a field multiplier, in a simply modified BOOTH multiplier the number of the partial products to be formed is halved, in FIG. 1 to $a_8 \ldots a_0$; $b_8 \ldots b_0$; $c_8 \ldots c_0$; $d_8 \ldots d_0$. This is achieved by eliminating the odd multiplier factor bits $Y_i = y_1, y_3, y_5, \ldots$ (i=1, 3, 5, ...) by splitting their information among the neighboring even binary digits:

$$Y_i \cdot 2_i = Y_i[2_i^{+1} - 2 \cdot 2^{i-1}] \quad i=0, 1, 2, 3 \ldots Y=0, 1 \qquad (1)$$

For example, the information for the fourth-lowest-order bit (i=3) is split into $$Y_3 \cdot 2^3 = Y_3[2^4 - 2 \cdot 2^2] \qquad (2)$$

Figure 3:
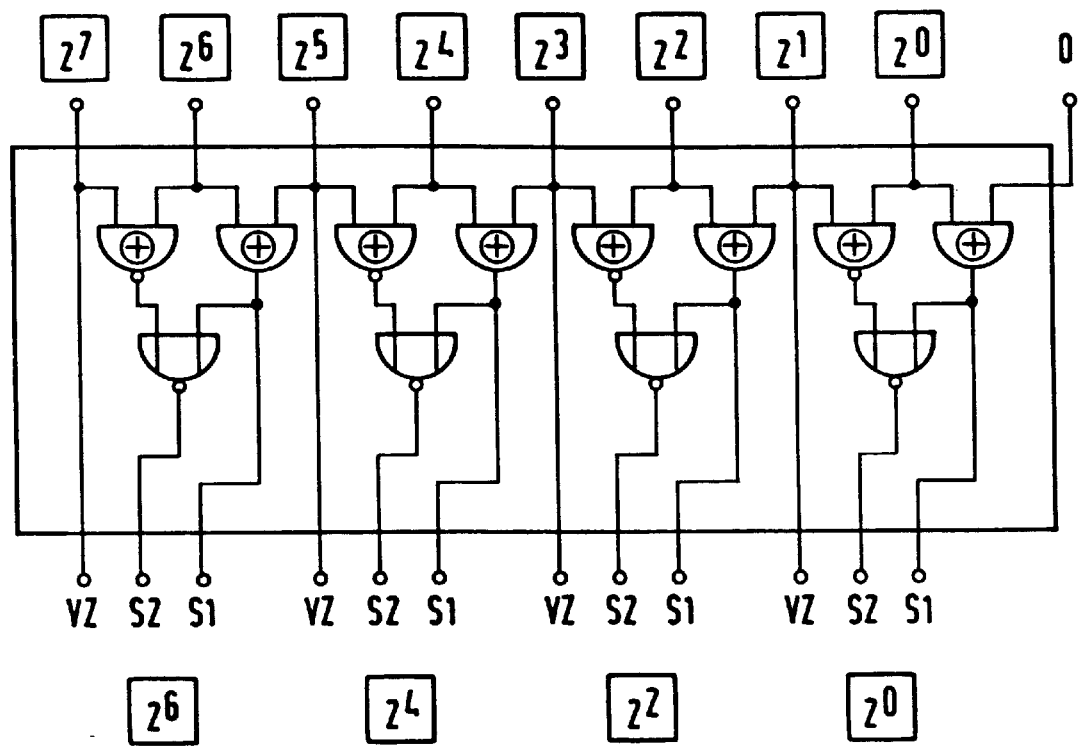
FIG. 3 shows a BOOTH coder.

The circuit of corresponding BOOTH coders BCO, which implement the conversion of the multiplier factor in accordance with formula (1), is represented in FIG. 3.

Figure 4:
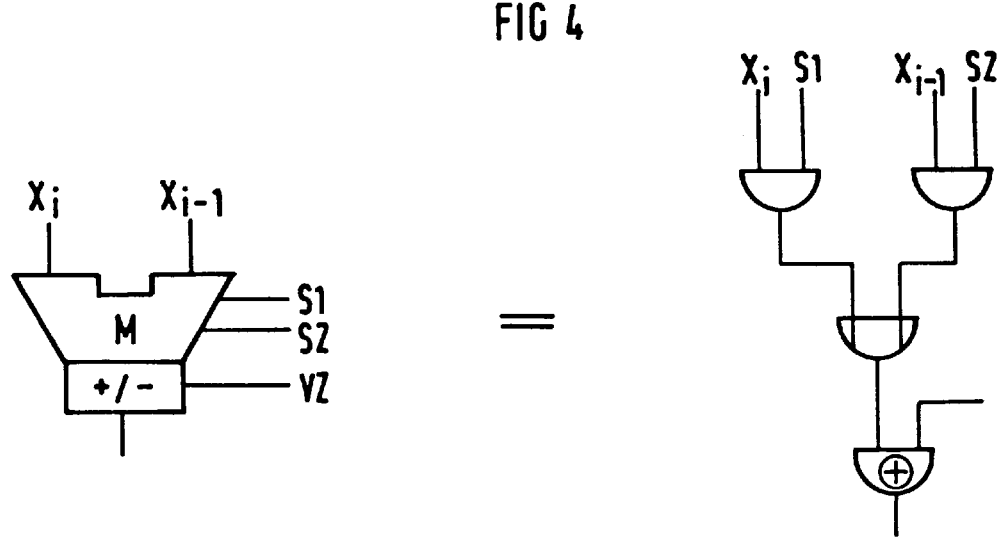
FIG. 4 shows a BOOTH multiplexer.

A so-called BOOTH multiplexer, whose mode of operation will be briefly explained, is represented in FIG. 4. Each BOOTH coder converts in each case 3 multiplier factor bits to binary BOOTH coefficients VZ, S1, S2, which specify the value range −2, −1, 0, 1, 2. In accordance with the BOOTH coefficients, the multiplicand must be added or subtracted once or twice, or ignored. The multiplicand is shifted by one bit with the aid of the BOOTH multiplexers M in the case of a two-fold addition. The multiplexer output is inverted for a required subtraction.

The function $F_i$ is implemented by a BOOTH multiplexer according to FIG. 4.

$$F_i = VZ \oplus (S2 \wedge X_{i-1} \vee S1 \wedge X_i) \qquad (3)$$

VZ=0/1 for +/−; VZ, S1, S2 —BOOTH coefficients

The output signals $a_i, b_i, c_i$ and $d_i$ ($0 \leq i \leq 8$) of the BOOTH multiplexers respectively correspond to partial products in one's complement representation. The sign bits $VZ_a$ ($0 \leq a \leq 3$) of the BOOTH coefficients are added in the final adder FA for the purpose of converting the partial products into two's complement numbers.

Formally, both the one's complement partial products and the sign bits are treated as two's complement numbers.

Figure 6:
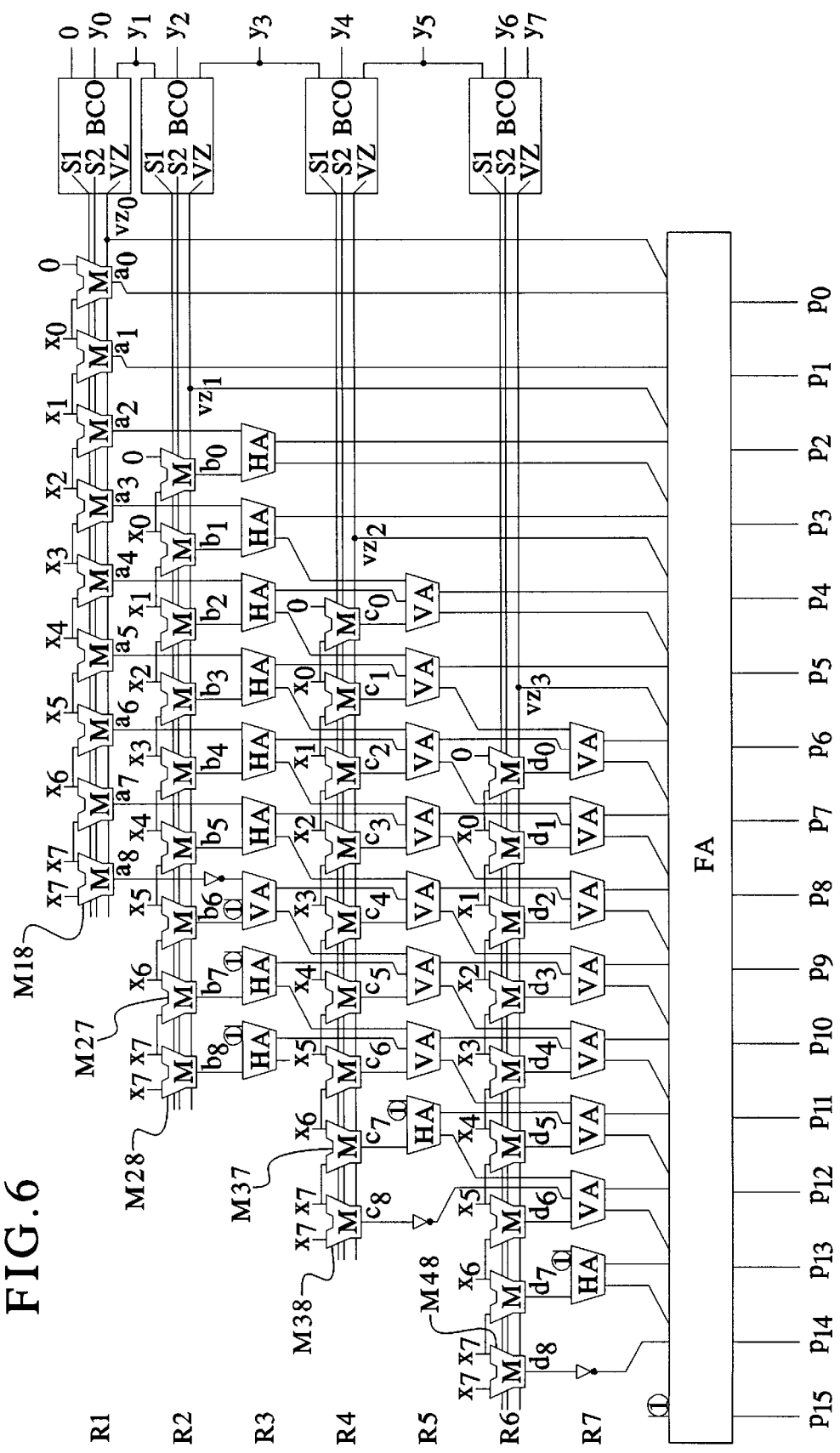
FIG. 6 shows a simplified BOOTH multiplier.

FIG. 6 represents a BOOTH multiplier, whose circuit no longer has these disadvantages.

If this circuit arrangement is compared with that of the conventional multiplier, it is seen that the load of the respective highest-order BOOTH multiplexer M18, M28, M38 . . . is reduced to a simple load. The inverter respectively represented can be eliminated by modifying the corresponding BOOTH multiplexer.

This circuit arrangement can also be regarded as an intermediate stage to a circuit which is optimized in terms of complexity. The half-adders HA, which are respectively connected to the output of a second-highest BOOTH multiplexer M27, M37, . . . , at the output of which a partial-product bit $b_7$ or $c_7$, . . . is output, can be replaced by an inverter.

Figure 7:
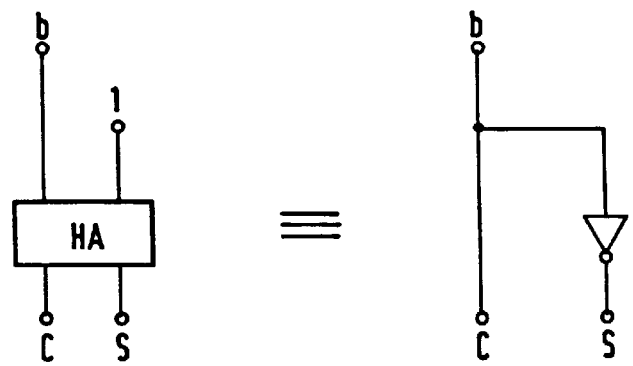
FIG. 7 shows an equivalent circuit for a half-adder.

This saves the half-adders to one input of which a logic one is otherwise fed. The equivalent circuits are represented in FIG. 7.

The conversion of the circuit can be performed purely diagrammatically, a one likewise being added at the highest-order position $P_{15}$.

The sign processing is firstly to be explained mathematically for the purpose of a better understanding of the invention.

The following Table 1 represents the assignment of the multiplier-factor bits MR, the partial products $PP_1$ to $PP_4$ and the product PR which is determined by summing the partial product bits and the sign coefficients.

TABLE 1

| PP | Multiplicand ($x_7$ $x_6$ $x_5$ $x_4$ $x_3$ $x_2$ $x_1$ $x_0$) | MR |
|---|---|---|
| $PP_1$ | $a_8$ $a_8$ $a_8$ $a_8$ $a_8$ $a_8$ $a_8$ $a_8$ $a_7$ $a_6$ $a_5$ $a_4$ $a_3$ $a_2$ $a_1$ $a_0$ | $y_1$ $y_0$ 0 |
| $PP_2$ | $b_8$ $b_8$ $b_8$ $b_8$ $b_8$ $b_8$ $b_7$ $b_6$ $b_5$ $b_4$ $b_3$ $b_2$ $b_1$ $b_0$ | $y_3$ $y_2$ $y_1$ |
| $PP_3$ | $c_8$ $c_8$ $c_8$ $c_8$ $c_7$ $c_6$ $c_5$ $c_4$ $c_3$ $c_2$ $c_1$ $c_0$ | $y_5$ $y_4$ $y_3$ |
| $PP_4$ | $d_8$ $d_8$ $d_7$ $d_6$ $d_5$ $d_4$ $d_3$ $d_2$ $d_1$ $d_0$ | $y_7$ $y_6$ $y_5$ |
|  | 0 0 0 0 0 0 0 0 0 $vz_3$0 $vz_2$0 $vz_1$0 $vz_0$ |  |
| PR | $P_{15}P_{14}P_{13}P_{12}P_{11}P_{10}P_9P_8P_7P_6P_5P_4P_3P_2P_1P_0$ |  |

A two's complement number X with the word length n can be represented as follows.

$$X = -x_{n-1} \cdot 2^{n-1} + \sum_{i=0}^{n-2} X_i \cdot 2^i \quad i = 0, 1, \ldots n-1 \quad (4)$$

The product-sign sum $S_{PV}$ of the sign-partial-product bits $a_8$, $b_8$, $c_8$ and $d_8$ extended to the maximum sum word length of 16 bits, which are represented bold in Table 1, is yielded as:

$$S_{PV} = a_8(-2^{15} + 2^{14} + \ldots + 2^8) + \quad (5)$$
$$b_8(-2^{15} + 2^{14} + \ldots + 2^{10}) +$$
$$c_8(-2^{15} + 2^{14} + \ldots + 2^{12}) +$$
$$d_8(-2^{15} + 2^{14})$$

with $$\sum_{i=j}^{n-1} 2^i = 2^n - 2^j \quad \text{the result is:} \quad (6)$$

$$S_{PV} = a_8(-2^{15} + 2^{15} - 2^8) + b_8(-2^{15} + 2^{15} - 2^{10}) + \quad (7)$$
$$c_8(-2^{15} + 2^{15} - 2^{12}) - d_8 \cdot 2^{14}$$
$$= -a_8 \cdot 2^8 - b_8 \cdot 2^{10} - c_8 \cdot 2^{12} - d_8 \cdot 2^{14}$$

The result from extending with $(-2^8+2^8)$, the negative and positive binary value of the sign bit of the first partial product PP1 which is to be extended, and of modulo $2^{16}$ addition ($\oplus$), exceeding the value range of $2^{16}$ is:

$$S_{PV} = -a_8 \cdot 2^8 - b_8 \cdot 2^{10} - c_8 \cdot 2^{12} - d_8 \cdot 2^{14} \oplus \quad (8)$$
$$(2^{16} - 2^8 + 2^8)$$
$$= -a_8 \cdot 2^8 - b_8 \cdot 2^{10} - c_8 \cdot 2^{12} - d_8 \cdot 2^{14} +$$
$$(2^{15} + 2^{14} + \ldots + 2^8) + 2^8$$
$$= 2^{15} + (1 - d_8) \cdot 2^{14} + 2^{13} + (1 - c_8) \cdot 2^{12} +$$
$$2^{11} + (1 - b_8) \cdot 2^{10} + 2^9 + (1 - a_8) \cdot 2^8 + 2^8$$

with $$(1 - k) = \overline{k}, \ (`-` = \text{modulo 2 subtraction}, \quad (9)$$
$$k = a_8, b_8, c_8, \ldots) \text{ the result is:}$$

$$S_{PV} = 2^{15} + \overline{d_8} \cdot 2^{14} + 2^{13} + \overline{c_8} \cdot 2^{12} + \quad (10)$$
$$2^{11} + \overline{b_8} \cdot 2^{10} + 2^9 + \overline{a_8} \cdot 2^8 + 2^8$$

This result means that:

by contrast with the representation according to Equation (5), all that exists is partial products with positive coefficients; the sign bits $a_8$, $b_8$, $c_8$ and $d_8$ of the partial products are inverted; the conversion of a half-adder into an inverter in accordance with formula (9) has already been considered; a one (which corresponds to the respective power of two) must be added to the partial product bits with the significances $2^8$, $2^9$, $2^{11}$, $2^{13}$ and $2^{15}$.

The implementation of this calculation is to be seen directly in FIG. 6, in which the term $\overline{b_8} \cdot 2^{10}$ is implemented as equivalent circuit by a half-adder.

The partial product bits are inverted at the output of the BOOTH multiplexer M18, M28, M38, and M48 or by in each case one inverter, represented for greater clarity, and this inversion relates to the partial product bits $a_8$, $b_8$, $c_8$, $d_8$.

The powers of two $2^8$, $2^9$, $2^{11}$, $2^{13}$ and $2^{15}$ are fed to the corresponding adders and the final adder FA. The additions are also possible in other circuit variants. As described below under 2), the circuit can be further simplified.

It is also possible to proceed diagrammatically in place of the mathematical calculation. Further simplifications are also possible.

1) In a first step, the sign supplementation is implemented by the following equation:

$$a_m 2^{m+p} \ldots + a_m 2^{m+2} + a_m 2^{m+1} + a_m 2^m = \quad (11)$$
$$2^{m+p} \ldots \oplus 2^{m+2} \oplus 2^{m+1} \oplus \overline{a_m} 2^m \oplus 2^m$$

$\oplus$=Modulo $2^{m+p}$ addition
m=Significance of the sign bit
m+p=Significance of the highest-order supplemented sign bit In the case of a sign extension by two binary digits it holds for the first adder row that:

$$a_8 2^{10} + a_8 2^9 + a_8 2^8 = 2^{10} + 2^9 + (2^8 + \overline{a_8} 2^8) \quad (12)$$

The circuit of adder row R3 in FIG. 6 in correspondingly transformed.

The transformations according to (12) are specified in the logic tables:

| $a_8 = 0$: | | | $a_8 = 1$: | | |
|---|---|---|---|---|---|
| $2^{10}$ | $2^9$ | $2^8$ | $2^{10}$ | $2^9$ | $2^8$ |
| 0 | 0 | 0 | 1 | 1 | 1 |
| 1 | 1 | 1 | 1 | 1 | 1 |
| + | | 1 | + | | 0 |
| 0 | 0 | 0 | 1 | 1 | 1 |

The respective carry bit, here $2^{m+p+1}$ ($=2^{11}$), is not required.

In terms of circuitry, the implementation of the equation means:

inversion of the sign bit $a_m$ and addition of $2^m$, that is to say a one, in a full adder VA in place of a half-adder HA ($a_8$ in FIG. 1 or FIG. 6; row R3), and in each case the addition of a constant one (corresponding to $2^{m+1}$ and $2^{m+2}$) at the higher-order positions in a half-adder HA (FIG. 6, row R3).

2) In the second step, the half-adders, to which a constant one (logic 1) is fed, for example the two highest-order half-adders in the first adder row R3 in FIG. 6, are replaced in accordance with:

$$HA: \quad S = b_m \oplus 1 = \overline{b_m} \quad (13)$$
$$C = b_m \cdot 1 = b_m$$

that is to say the sum bit S corresponds to the inverted input signal $b_m$, and the carry bit C corresponds to the input signal $b_m$ (FIG. 7).

Since the carry is not required in the case of the highest-order half-adder, only the inverted partial product bit b has to be wired (this has already taken place in the further adder rows of the multiplier in FIG. 6).

The two highest-order half-adders of all the adder rows are then respectively replaced by inverters in FIG. 1.

3) In the third step, the functions of the two highest-order full adders VA of the further adder rows R5 and R7 can respectively be replaced in FIG. 2 in accordance with:

$$VA: \quad S = c_m \oplus b \oplus \overline{b} = \overline{c_m} \quad (14)$$
$$C = c_m(b + \overline{b}) + b\overline{b} = c_m$$

Figure 8:
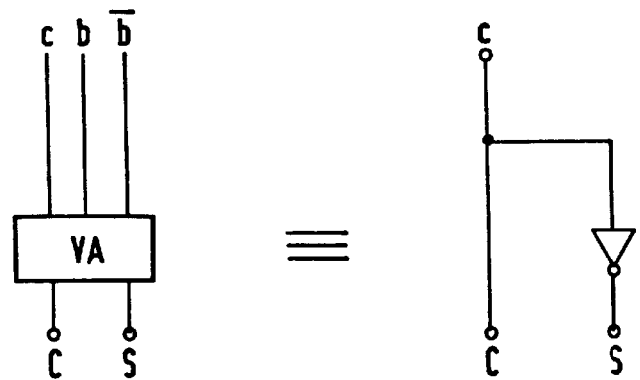
FIG. 8 shows an equivalent circuit for a full adder, in the case of special input combinations.

The corresponding circuit is represented in FIG. 8.

The full adders can respectively firstly be replaced by a half-adder, which is connected, for example, in accordance with FIG. 6 to the BOOTH multiplexer M37, or by an inverter in accordance with FIG. 8. This measure leads to a design in terms of circuitry according to FIG. 1.

This figure shows an advantageous BOOTH multiplier in which half-adders and full adders are replaced by inverters because of the circuit simplification.

Furthermore, the circuits for full adders which are fed a constant one can likewise be simplified.

$$VA: \quad S = a \oplus b \oplus 1 = \overline{a \oplus b} \quad (15)$$
$$C = a \wedge b \vee 1 \wedge a \vee 1 \wedge b = a \vee b$$

The full adder VA, which adds a constant one, can thus be replaced by an EX-NOR gate and an OR gate.

The principle of the sign supplementation can be applied to different multiplier types, even if it is necessary to perform a sign supplementation by more than two positions (for example the publication by M. Belleville et al. "A 16*16 bits Multiplier 0.5 μm CMOS technology", Proceedings of ESSCIRC'91, Milan/Italy, September 1991).

In the case of the "lowest-order" sign position, inversion of the sign bit and the addition of a logic "1" are performed—as previously. In the higher-order half-adders (adders) a constant logic "1" is added, or they are replaced by an inverter.

The further adder rows are modified in a corresponding way, that is to say the middle changed adder circuit which is fad the partial product bit $b_7$ in FIG. 1 occurs more frequently.

If only one sign position has to be supplemented in an adder row, a full adder and a half-adder or inverter are required for this purpose (the half-adder HA in FIG. 6, to which the partial product bit $b_7$ is fad, would be eliminated).

The invention will now be explained with reference to a field multiplier using carry-save technology.

Figure 9:
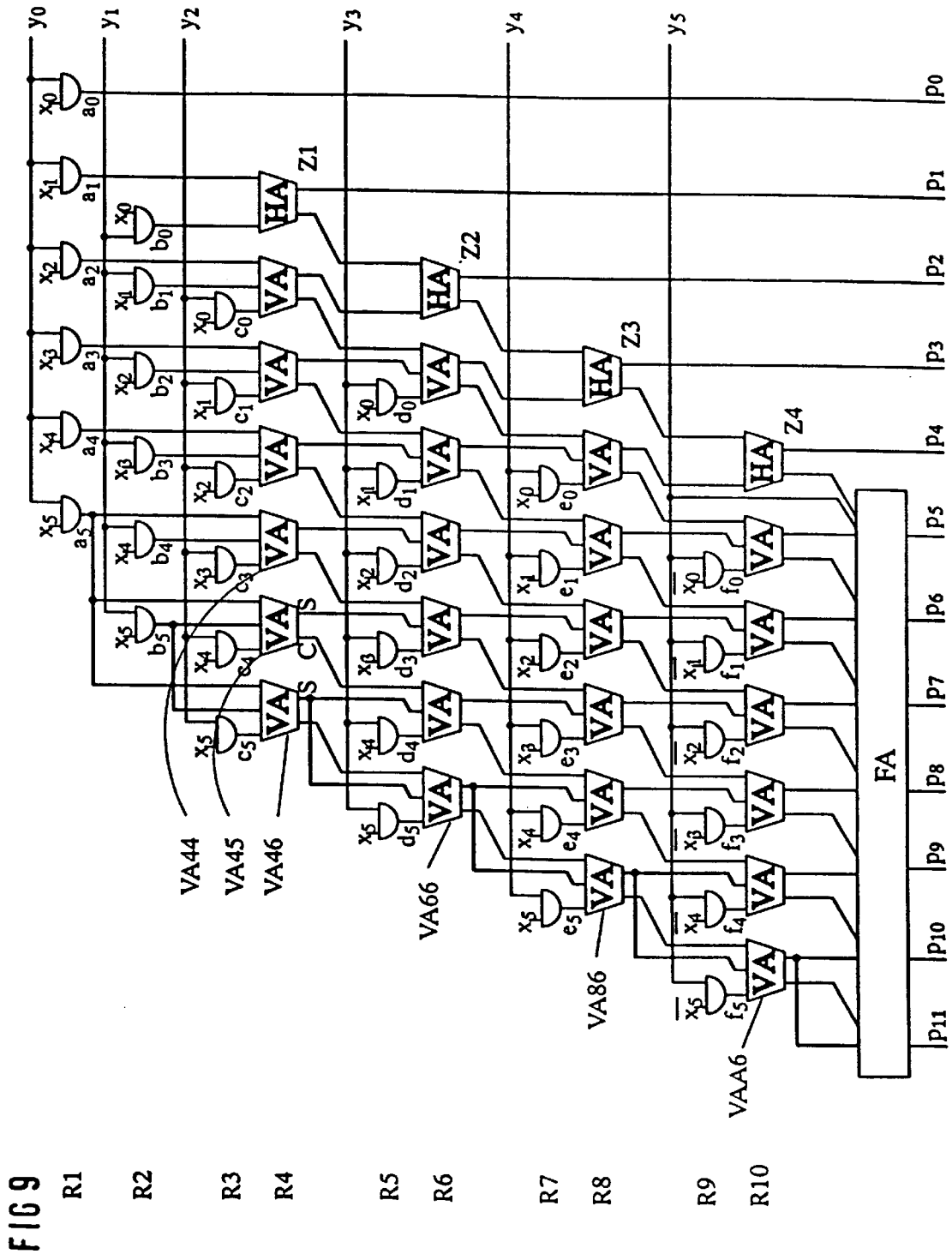
FIG. 9 shows a field multiplier using carry-save logic.

Such a multiplier is represented in FIG. 9. Partial products $a_5 \ldots a_0, b_5 \ldots b_0, \ldots, f_5 \ldots f_0$ are formed in multiplier rows R1, R2, R3, R5, R7 and R9 by multiplying the multiplicand $x=x_5 \ldots x_0$ by in each case one bit of the multiplier factor $y=y_5 \ldots y_0$. The first three partial products $a_5 \ldots a_0, b_5 \ldots b_0, c_5 \ldots c_0$ are combined in parallel in a first adder row R4 to form a "subtotal" Z1 which comprises sum bits "S" and carry bits "C" (for reasons of clarity these are denoted in FIG. 5 only in the case of the full adder VA45).

A further partial product $d_5 \ldots d_0, \ldots, f_5 \ldots f_0$ is respectively added to this intermediate value in further adder rows R6, R8 and R10.

The wiring, which is to be simplified, of the sign bits is represented by wider lines. The sign bit $a_5$ of the first partial product $a_5 \ldots a_0$ is led in the first adder row R4 to the three highest-order full adders VA44 ... VA46, and the sign bit $b_5$ of the second partial product $b_5 \ldots b_0$ is likewise led to the same two highest-order full adders VA45 and VA46.

The sum bit output at the highest-order full adder VA46, VA66, VA86, ... is respectively to be supplemented by one bit position in the adder row R4 and the next adder rows.

The last partial product is formed by multiplying the two's complement of the multiplicand x by the sign bit $y_k$ of the multiplier factor y. The final product is calculated from the sum and carry bits in a final adder FA, for example a ripple adder.

In the case of a representation of the negative numbers in two's complement, the product is calculated in accordance with (16) as:

$$xy = \sum_{i=0}^{k-1} xy_i \cdot 2^i + (\overline{x} + 1)y_k \cdot 2^k \quad (16)$$

$$x = x_m \ldots x_0 \quad y = y_k \ldots y_0$$

The circuit is to be simplified in the region of the highest-order full adders VA46 ... VAA6.

Applying the known algorithm, in which the sign bits are inverted and a one is added in each case does not achieve the aim, since it would then be necessary in each case to use adders VA44, VA45 having four inputs.

The required method for circuit simplification is to be explained firstly only with consideration of the to sign bits of two numbers; it can be extended without difficulty.

In a first step, the sign bit supplementation is implemented for a sign bit $a_k$ by means of the following equation.

$$a_k \cdot 2^{k+p} \ldots + \ldots a_k \cdot 2^{k+2} + a_k \cdot 2^{k+1} + a_k \cdot 2^k = 2^{k+p} \ldots \oplus \ldots \\ 2^{k+2} \oplus \bar{a} \cdot 2^{k+1} \oplus 2^{k+1} \oplus a_k 2^k \quad (17)$$

$\oplus$=Modulo $2^{k+p+1}$ addition
k=Significance of the sign bit
k+p=Significance of the supplemented highest-order sign bit.

Neglecting the lower-order bits, it holds, for example with k=5, that:

$$a_5 \cdot 2^7 + a_5 \cdot 2^6 = 2^7 + \bar{a}_5 \cdot 2^6 + 2^6 \text{ and} \quad (18)$$

$$b_5 \cdot 2^7 + b_5 \cdot 2^6 = 2^7 + \bar{b}_5 \cdot 2^6 + 2^6. \quad (19)$$

$\bar{a}_5, \bar{b}_5$ – inverted sign bits

An addition of these bits—supplemented by the addition of the highest-order bits $c_5$, $c_4$ of a further number—can be represented in tabular form, ordered by column in terms of significances:

|  | $2^7$ | $2^6$ |  | $2^7$ | $2^6$ |  | $2^7$ | $2^6$ | (20) |
|---|---|---|---|---|---|---|---|---|---|
|  | $a_5$ | $a_5$ |  | 1 | $(\bar{a}_5+1)$ |  |  | $\bar{a}_5$ |  |
|  | $+b_5$ | $+b_5$ | ≡ | $+1$ | $(\bar{b}_5+1)$ | ≡ | $+1$ | $+\bar{b}_5$ |  |
|  | $+c_5$ | $+c_4$ |  | $+c_5$ | $+c_4$ |  | $+c_5$ | $+c_4$ |  |

The two middle columns are transformed in accordance with formulae (18) and (19). The addition of the logic ones has already been carried out in the two right-hand columns. The transformation represented in the two right-hand columns in to be interpreted such that the sum is calculated by adding the inverted sign bits of significance $2^6$ and the bit $C_4$ of the third partial product as well as by adding a logic 1 and the sign bit $c_5$ of the third partial product.

Figure 10:
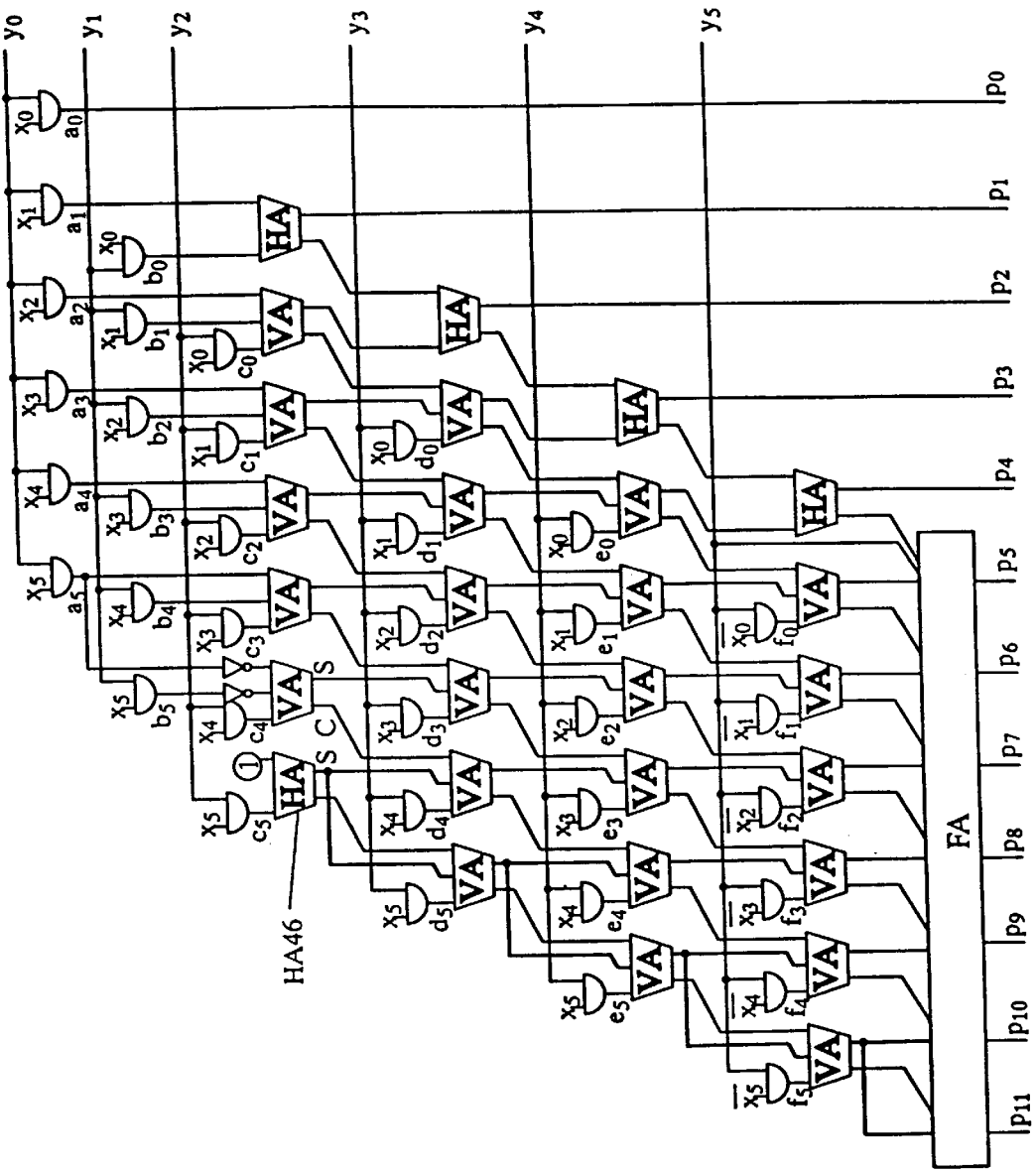
FIG. 10 shows an embodiment according to the invention of the field multiplier.

This simplification is carried out in the first adder row R4 in the multiplier represented in FIG. 10. The second-highest-order full adder VA45 is fed the sign bits $a_5$ and $b_5$ inverted, and the highest-order full adder VA46 (FIG. 9) has already been replaced by a half-adder HA46, which in addition to the sign bit $c_5$ is fed a constant one.

Of course, a transformation in accordance with formula (17) or (18) can also be carried out in the case of the highest-order full adder VA46 (FIG. 9) and in the case of the half-adder HA 46 (FIG. 10). However, by contrast with the measures described below, this does not lead to any further circuit simplification.

Figure 11:
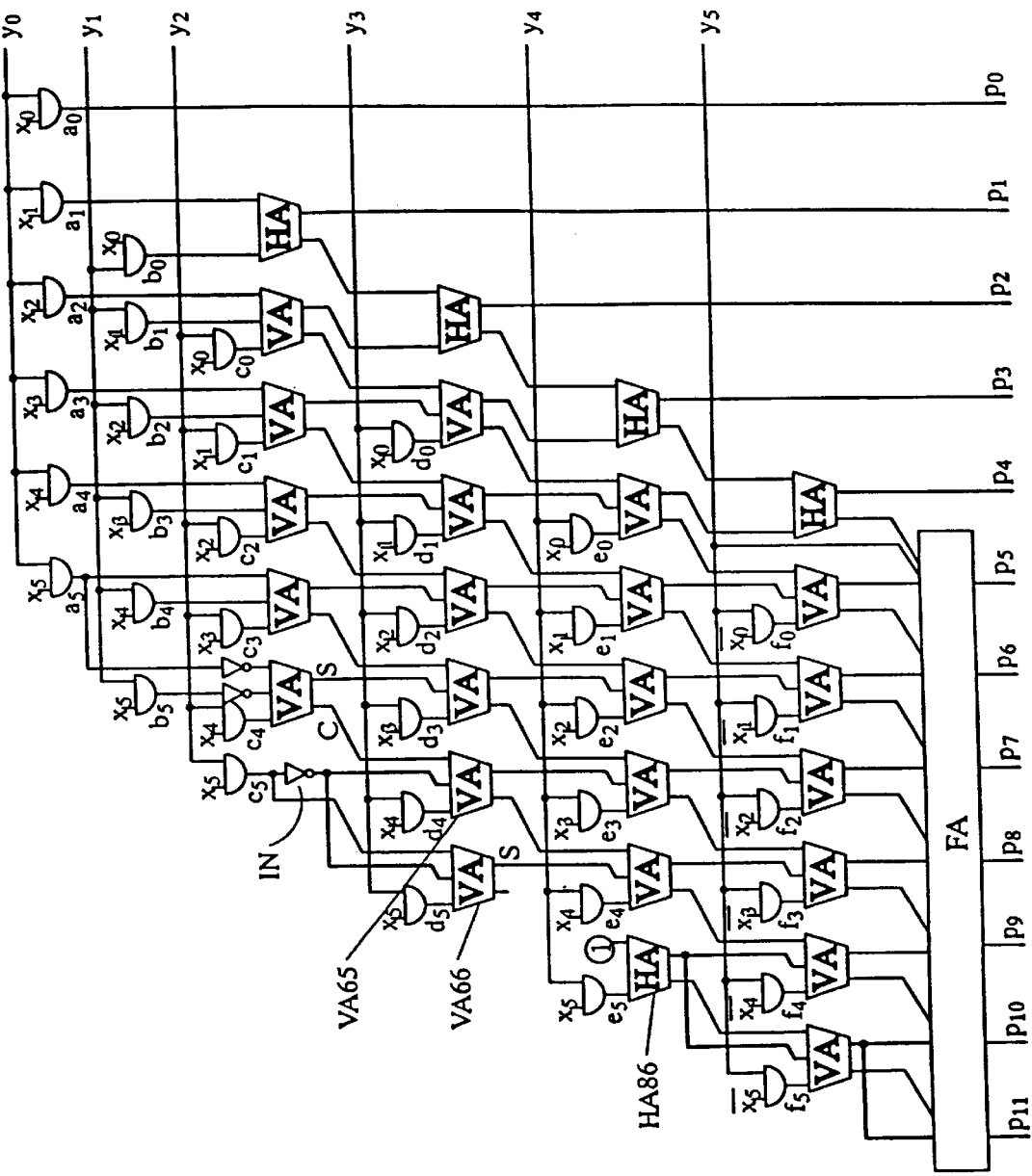
FIG. 11 shows a further improved field multiplier.

In accordance with the logic function (13) of a half-adder, the circuit arrangement according to FIG. 10 can be further simplified by initially replacing the highest-order half-adder HA46 by an inverter. The result of this is FIG. 11.

The highest-order full adder VA66 of the second adder row R6 is fed two mutually inverted input signals. In a third step, it is therefore possible to replace this full adder—and the other highest-order full adders VA86 to VAA6 (FIG. 9)—of the further adder rows correspondingly (14).

Since there are always two mutually inverted input values b and $\bar{b}$ to be processed, one half-adder, to which in addition to a variable input value $c_m$ a one is fed, suffices. This simplification has so far been performed in FIG. 11 only in the case of a full adder VA86 (FIG. 10) which was replaced by a half-adder RA86.

Figure 12:
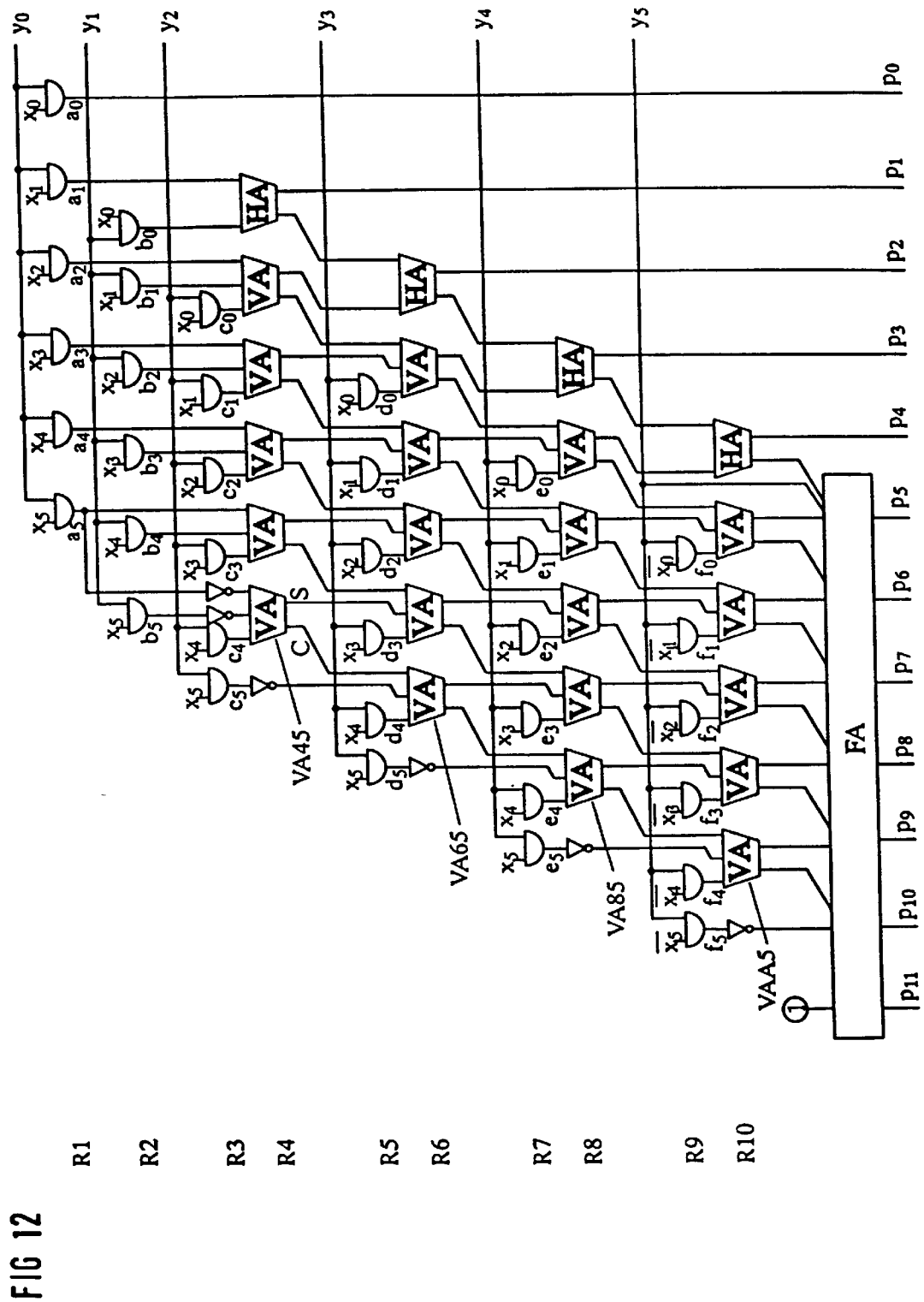
FIG. 12 shows an optimized field multiplier.
Figure 13:
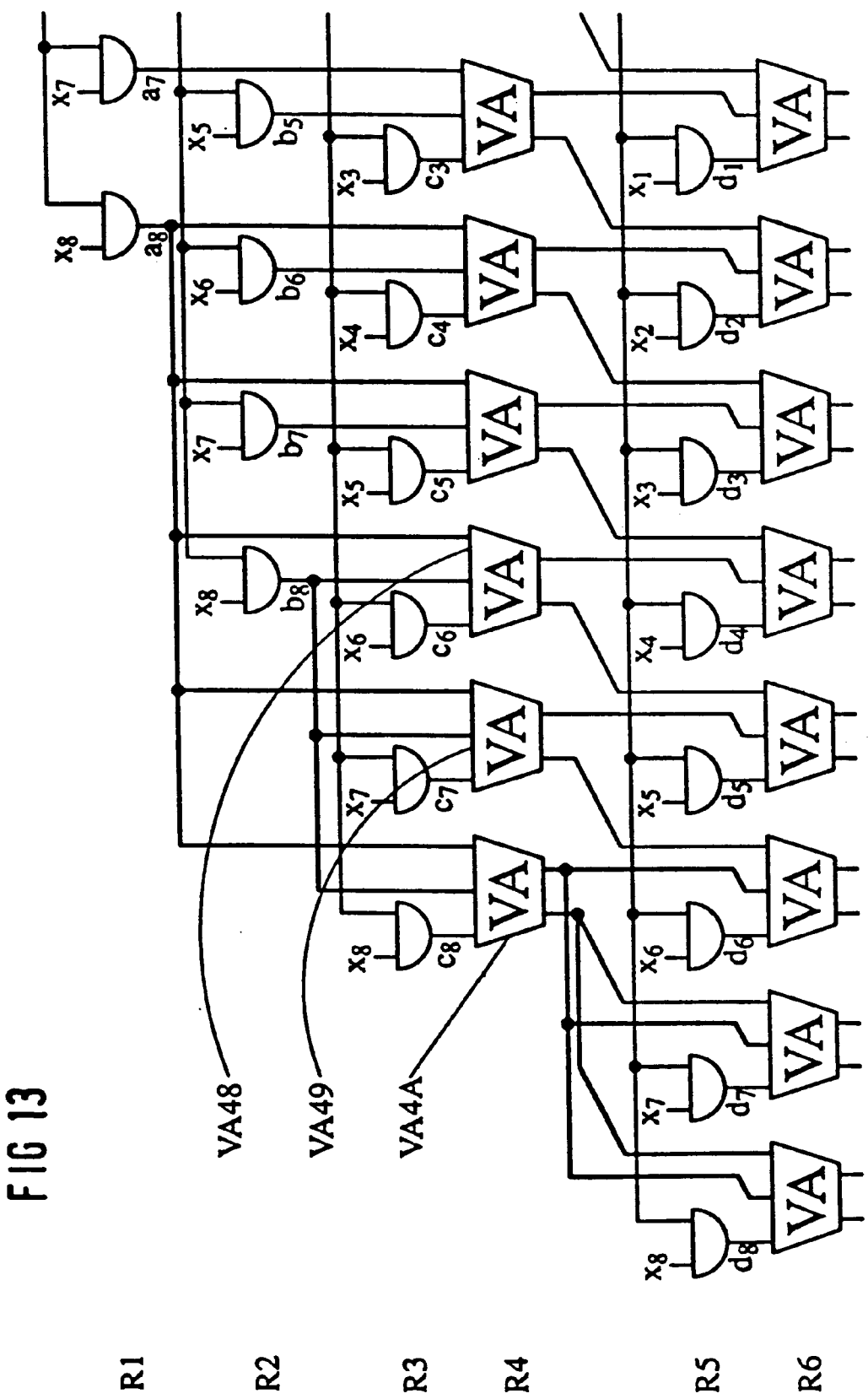
FIG. 13 shows a detail of the multiplier circuit.

The remaining highest-order full adders can also be replaced by half-adders to which a constant one (logic 1) is fed, and the half-adders can, in turn, be replaced by an inverter. This optimized circuit arrangement is represented in FIG. 12. The highest-order full adders VA46, VA66, ... VAA6 from FIG. 9 have become superfluous.

Transformations of the circuit in accordance with the Boolean rules are possible, of course. For example, the series circuit of a gate with an inverter can be replaced by an inverting gate, and the function of an AND gate can be simulated by an OR gate.

The principle of sign bit supplementation which has been described can be extended for an arbitrary number of bit positions, there being particular interest in bit positions in which at least two sign bits are processed.

It holds in accordance with (20) that:

|  | $2^8$ | $2^7$ | $2^6$ | $2^5$ |  | $2^8$ | $2^7$ | $2^6$ | $2^5$ | (21) |
|---|---|---|---|---|---|---|---|---|---|---|
|  | $+a_5$ | $+a_5$ | $+a_5$ | $+a_5$ |  |  |  |  | $\bar{a}_5$ |  |
|  | $+b_5$ | $+b_5$ | $+b_5$ | $+b_5$ | ≡ | 1 | 1 | 1 | $+\bar{b}_5$ |  |
|  | $+c_{y+3}$ | $+c_{y+2}$ | $+c_{y+1}$ | $+c_y$ |  | $+c_{y+3}$ | $+c_{y+2}$ | $+c_{y+1}$ | $+c_y$ |  |

This means in terms of circuitry that downstream of the full adder to which the sign bits are fed inverted, all the higher-order full adders can be replaced by half-adders to which a one is fed in each case in addition to a c-bit. The addition of a one means an inversion of the c-bit; the half-adder can therefore be replaced in accordance with formula (13) by an inverter.

A generally valid algorithm for the simplified sign bit supplementation can also be derived. A two's complement number $X = X_k \ldots X_0$ with word length k+1 can be represented as follows:

$$X = -X_k \cdot 2^k + \sum_{i=0}^{k-1} X_i \cdot 2^i \quad i = 0, 1, \ldots \quad (22)$$

In the case of a sign bit extension by S bits, it holds for the sum of the sign bits A and B that:

$$\sum AB = -a_k \cdot 2^{k+2S} + \sum_{i=k+S}^{k+2S-1} a_k \cdot 2^i - b_k \cdot 2^{k+2S} + \sum_{i=k+S}^{k+2S-1} b_k \cdot 2^i \quad (23)$$

$$= (a_k + b_k) \cdot (-2^{k+2S} + 2^{k+2S-1} + \ldots + 2^{k+S})$$

$$= (a_k + b_k) \cdot \left(-2^{k+2S} + \sum_{i=k+S}^{k+2S-1} 2^i\right)$$

-continued where $\sum_{i=k+S}^{k+2S-1} 2^i = 2^{k+2S} - 2^{k+S}$ $\sum AB = -(a_k + b_k)2^{k+S}$ with the addition of $-2^{k+S} + 2^{k+S} (+) 2^{k+2S+1} = 0$, (+) = modulo $2^{k+2S+1}$ addition (exceeds the maximum value by 1)

$\sum AB = -(a_k + b_k)2^{k+S} (+) 2^{k+2S+1} - 2^{k+S} + 2^{k+S}$ where $2^{k+2S+1} - 2^{k+S} = \sum_{i=k+S}^{k+2S} 2^i$ $= -(a_k + b_k)2^{k+S} + \sum_{i=k+S}^{k+2S} 2^i + 2^{k+S}$ $= -(a_k + b_k)2^{k+S} + \sum_{i=k+S+1}^{k+2S} 2^i + 2^{k+s} + 2^{k+S}$ where $(1-a) = \bar{a}, (1-b) = \bar{b}$ $$\sum AB = \sum_{i=k+S+1}^{k+2S} 2^i + (\bar{a}_k + \bar{b}_k)2^{k+S} \quad (24)$$

For the individual binary digits, the respective partial product bit or a carry bit from the preceding adder row must further be added in the case of a circuit implementation.

Figure 5:
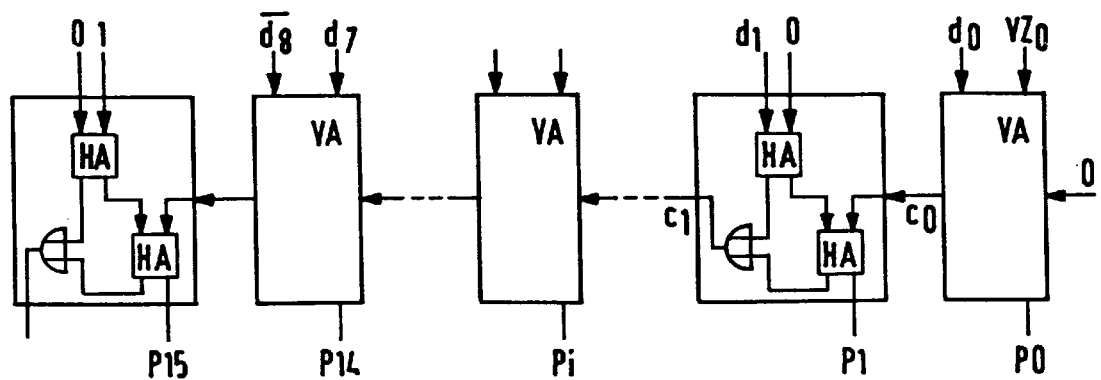
FIG. 5 shows a final adder.

A detail from a parallel-operating carry-save multiplier with sign bit supplementation of two bits between two successive adder rows is represented in FIG. 5. The two output values of the highest-order full adder VA4A must be supplemented.

The first adder row R4 is firstly converted in accordance with Table (21) or according to formula (24).

Figure 14:
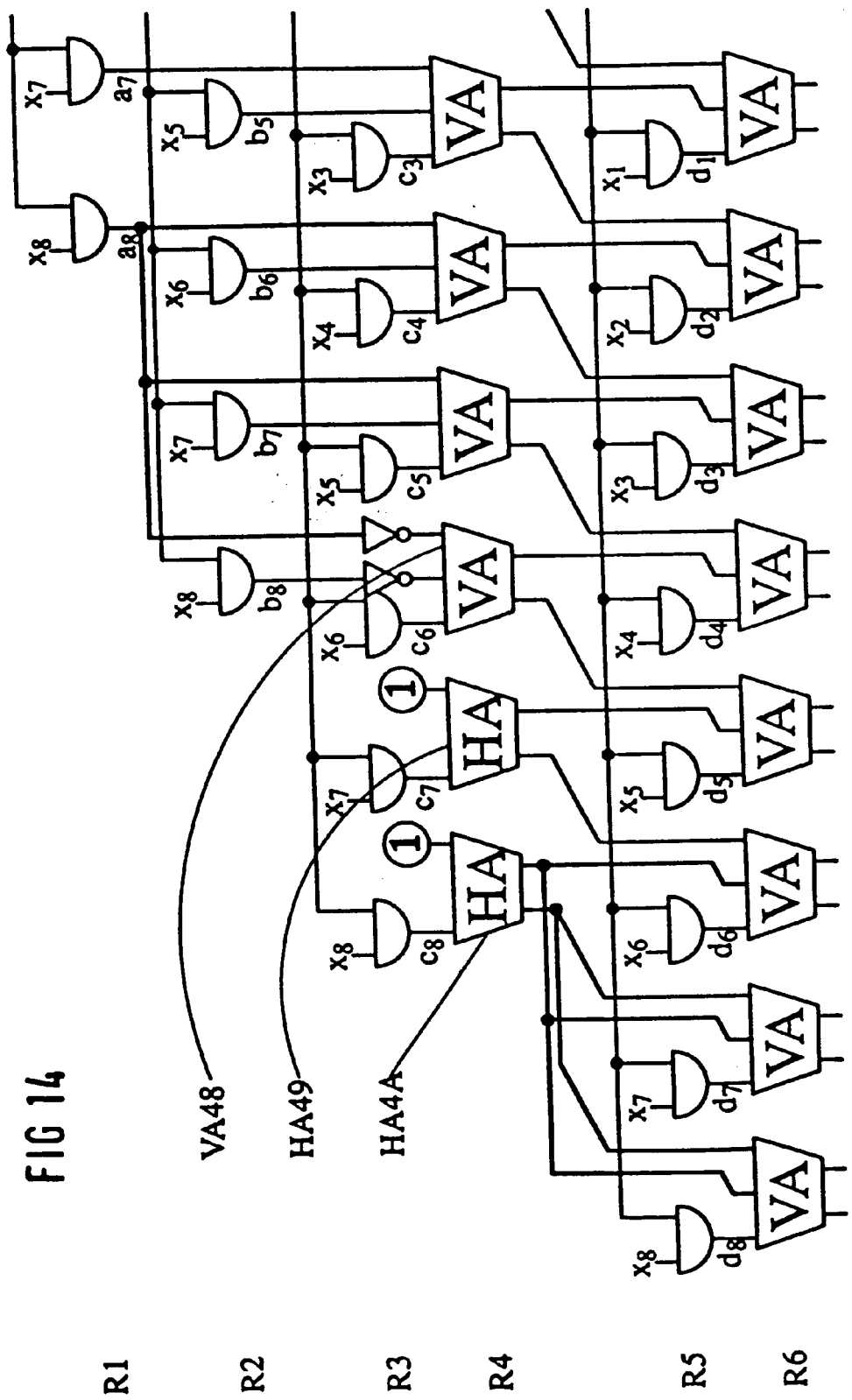
FIG. 14 shows a variant of this detail with sign bit supplementation according to the invention.

FIG. 14 shows the inversion of the input values for the full adder VA48, and the conversion of the two highest-order full adders into half-adders HA49 and RA4A.

Figure 15:
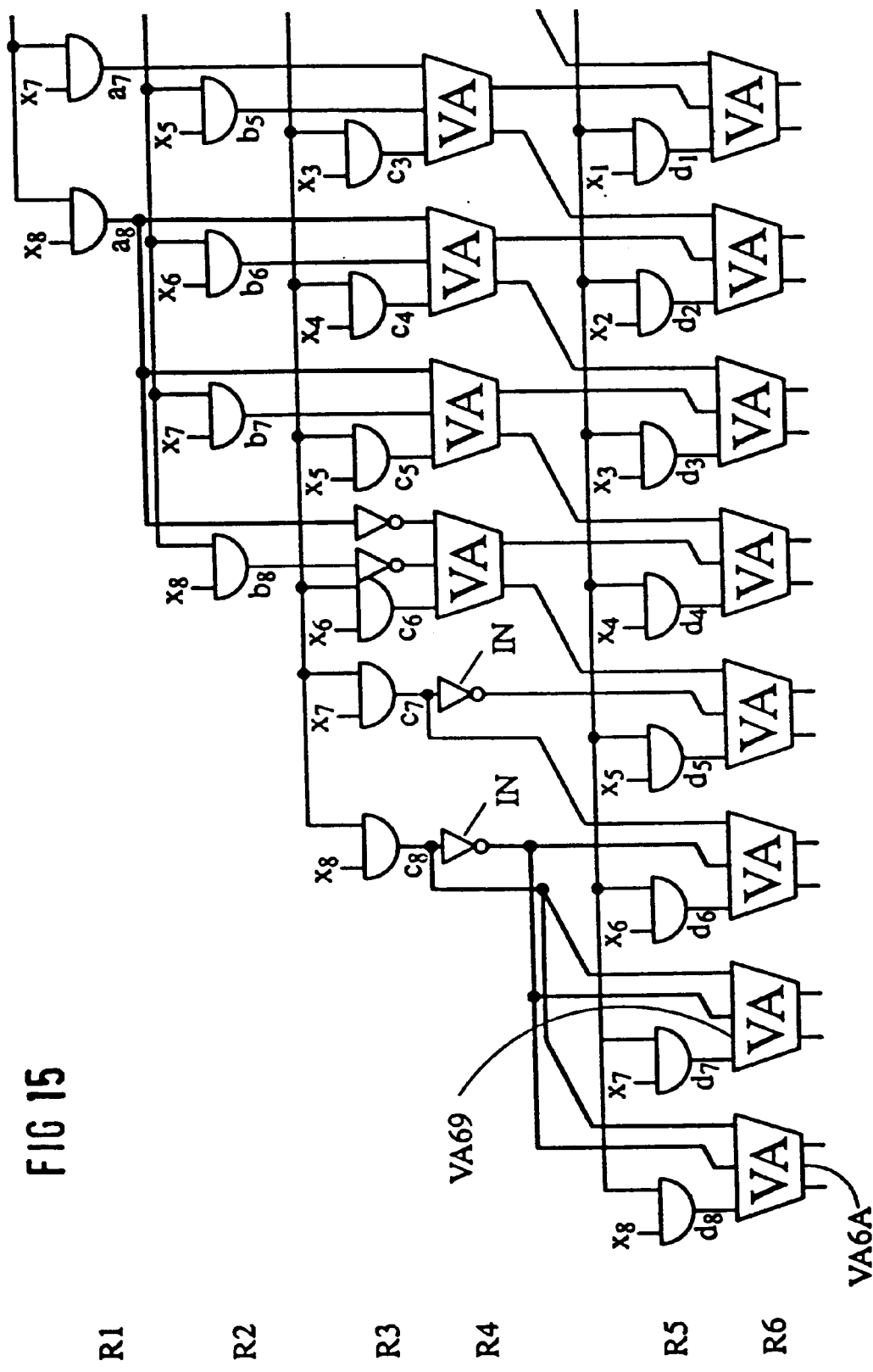
FIG. 15 shows a further simplified multiplier component circuit.

In a second step, the half-adders HA49 and HA4A in accordance with formula (13) are respectively replaced by an inverter. The circuit obtained is represented in FIG. 15.

In a third step, the two highest-order full adders VA6A, VA69 of the following adder row(s) R6 in accordance with formula (14) are replaced by half-adders HA6A, RA69 which again are constructed as inverters (the sequence of the second and third steps is arbitrary).

Figure 16:
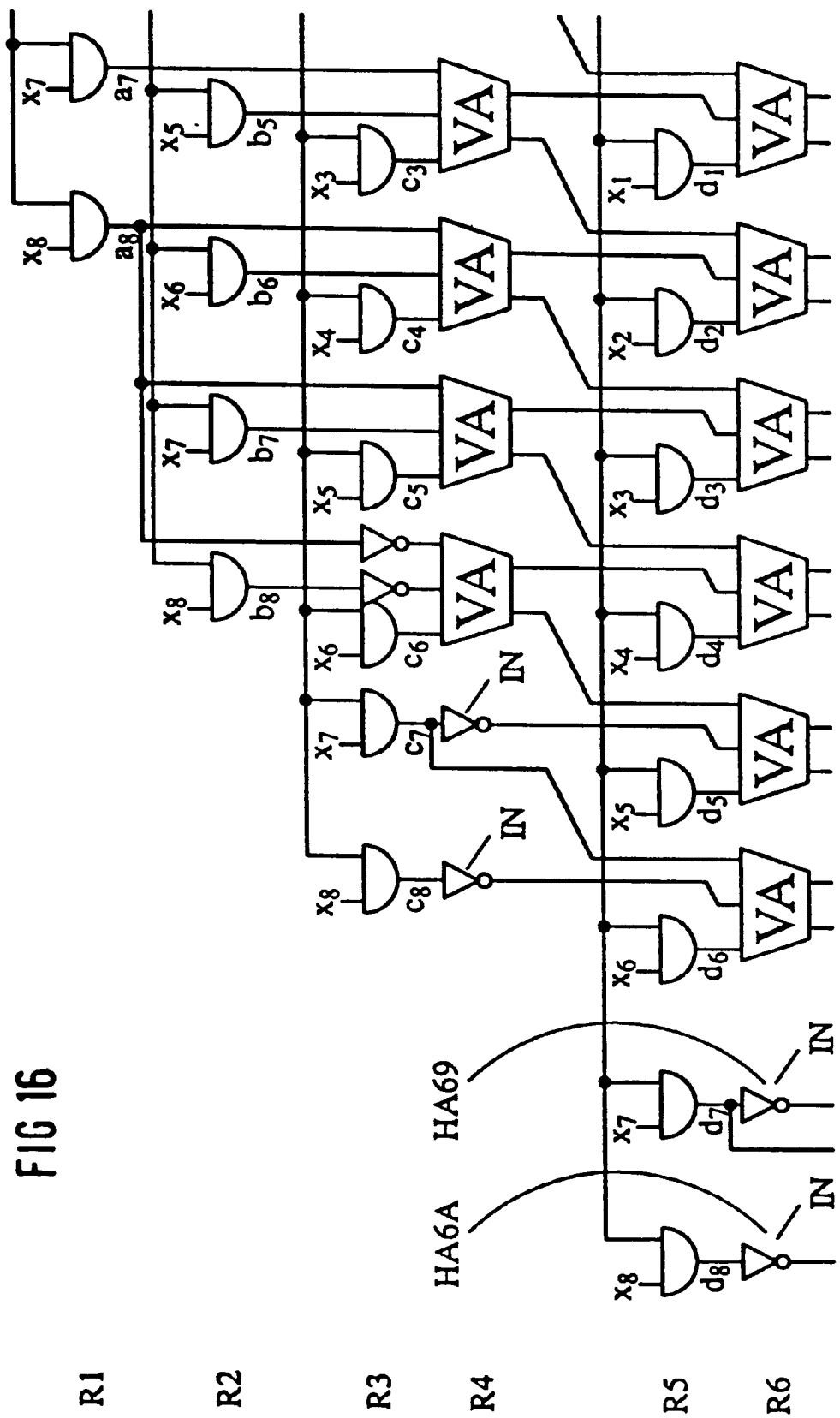
FIG. 16 shows the optimized embodiment of the latter.

FIG. 16 shows the optimized circuit arrangement. This mode of procedure can be applied in the case of sign bit supplementations of any size.

The invention will now be explained for a multiplier using carry-ripple technology.

Figure 17:
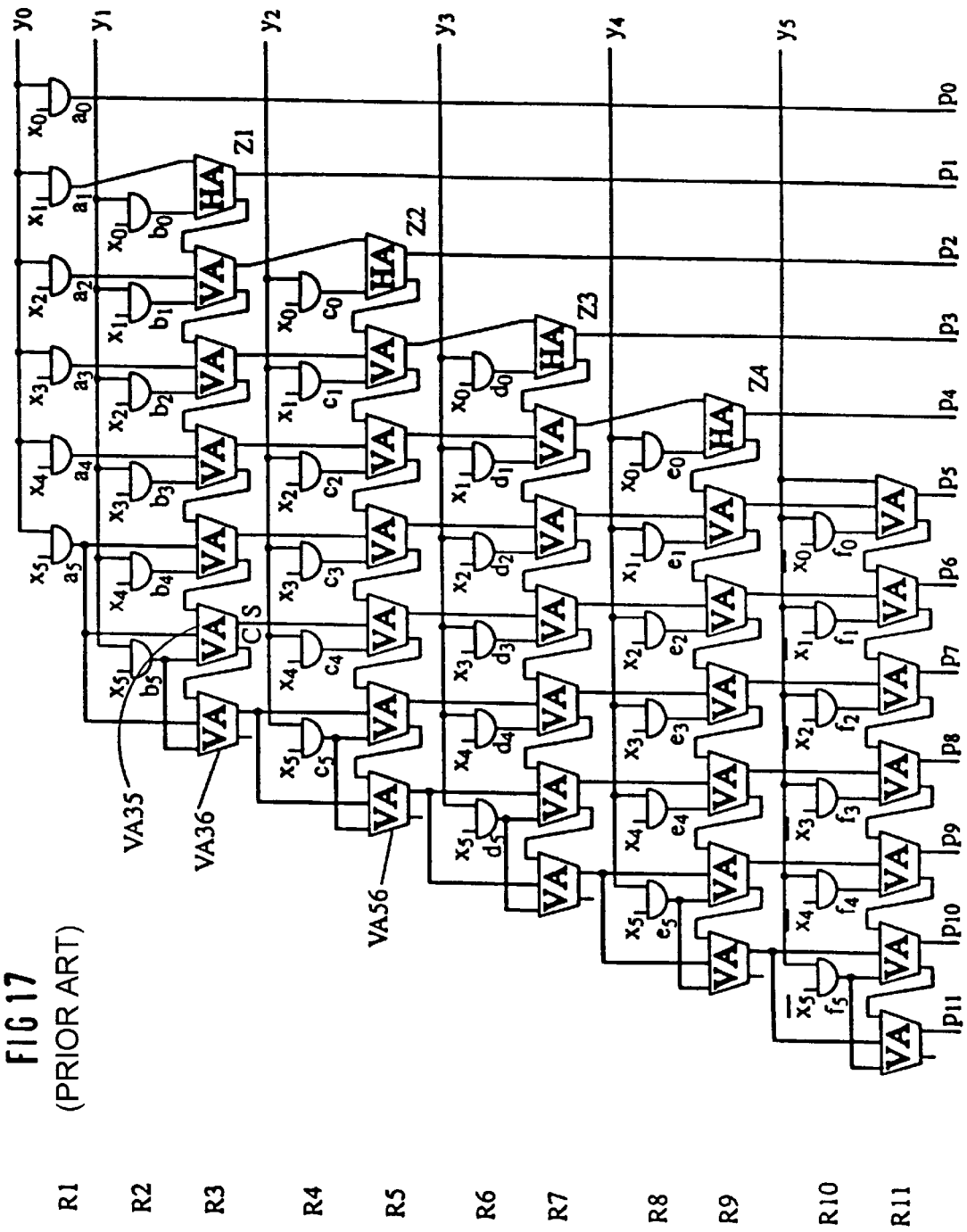
FIG. 17 shows a known field multiplier using carry-ripple logic.

A known field multiplier using carry-ripple technology is represented in FIG. 17. Partial products $a_5 \ldots a_0, b_5 \ldots b_0, \ldots, f_5 \ldots f_0$ are formed in multiplier rows R1, R2, R4, R6, R8 and R10 by multiplying the multiplicand $x=x_5 \ldots x_0$ by in each case one bit of the multiplier factor $y=y_5 \ldots y_0$. The first two partial products $a_5 \ldots a_0, b_5 \ldots b_0$ are combined in a first adder row R3 to form a 'subtotal' Z1 which is present at the sum outputs "S" of the adders VA, HA (for reasons of clarity, the sum outputs S and the carry outputs C are illustrated only by the full adder VA35 in FIG. 17 (and FIGS. 18 and 19)).

A further partial product $c_5 \ldots c_0, \ldots, f_5 \ldots f_0$ is added in each case in further adder rows R5, R7, R9 and R11.

The 'wiring' of the sign bit is represented by wider lines. In the first adder row R3, the sign bit $a_5$ of the first partial product $a_5 \ldots a_0$ is led to the three highest-order full adders VA34 . . . VA36, and the sign bit $b_5$ of the second partial product $b_5 \ldots b_0$ is led to the two highest-order full adders VA35 and VA36.

Only the supplementation by one sign bit in relation to the subtotal formed is respectively required in the next adder rows R5 . . . R11.

The last partial product $f_5 \ldots f_0$ is formed by multiplying the two's complement of the multiplicand x by the sign bit $y_k$ of the multiplier factor y, and is added to the last subtotal Z4 in order to obtain the final product $p_{11} \ldots p_0$.

The product in the case of a representation of the negative numbers in two's complement is calculated correspondingly (16) in the multiplier.

The algorithm already derived for the sign extension also holds for this type of multiplier. The circuit is to be simplified in accordance with the procedure already described in the region of the highest-order full adders VA36, VA 56, . . .

The sign supplementation is implemented for a sign bit $a_k$ (from a significance $\geq 2^k$) by Equation (17) in a first step.

This sign supplementation is carried out in the specified circuit in the case of the highest-order full adders VA36, VA35 of the adder row R3. Neglecting the lower-order bits, it holds that:

$$a_5 \cdot 2^7 + a_5 \cdot 2^6 = 2^7 + \bar{a}_5 \cdot 2^6 + 2^6 \quad (25)$$

and $$b_5 \cdot 2^7 + b_5 \cdot 2^6 = 2^7 + \bar{b}_5 \cdot 2^6 + 2^6 \quad (26)$$

where $\bar{a}_5, \bar{b}_5$ are inverted sign bits.

The sum is formed from the bits obtained by transformation—in accordance with the sign bits.

The addition of these bits—supplemented by carry bits $C_6$ and $C_5$—can be represented in tabular form:

| $2^7$ | $2^6$ | $2^7$ | $2^6$ | $2^7$ | $2^6$ | (27) |
|---|---|---|---|---|---|---|
| $a_5$ | $a_5$ | 1 | $(\bar{a}_5+1)$ | | $\bar{a}_5$ | |
| $+b_5$ | $+b_5$ | ≡ +1 | $(\bar{b}_5+1)$ | ≡ +1 | $+\bar{b}_5$ | |
| $+C_6$ | $+C_5$ | $+C_6$ | $+C_5$ | $+C_6$ | $+C_5$ | |

The two middle columns are transformed in accordance with formulae (25) and (26). The addition of the one's has already been carried out in the two right-hand columns. The transformation represented in these columns is to be interpreted such that the sum is calculated by adding the inverted sign bits of significance $2^6$ and the carry bit $c_5$ of the third partial product as well as by adding a logic 1 and the sign bit $C_5$. Adding a one means an inversion of the carry bit; the half-adder can therefore be replaced by an inverter.

Figure 18:
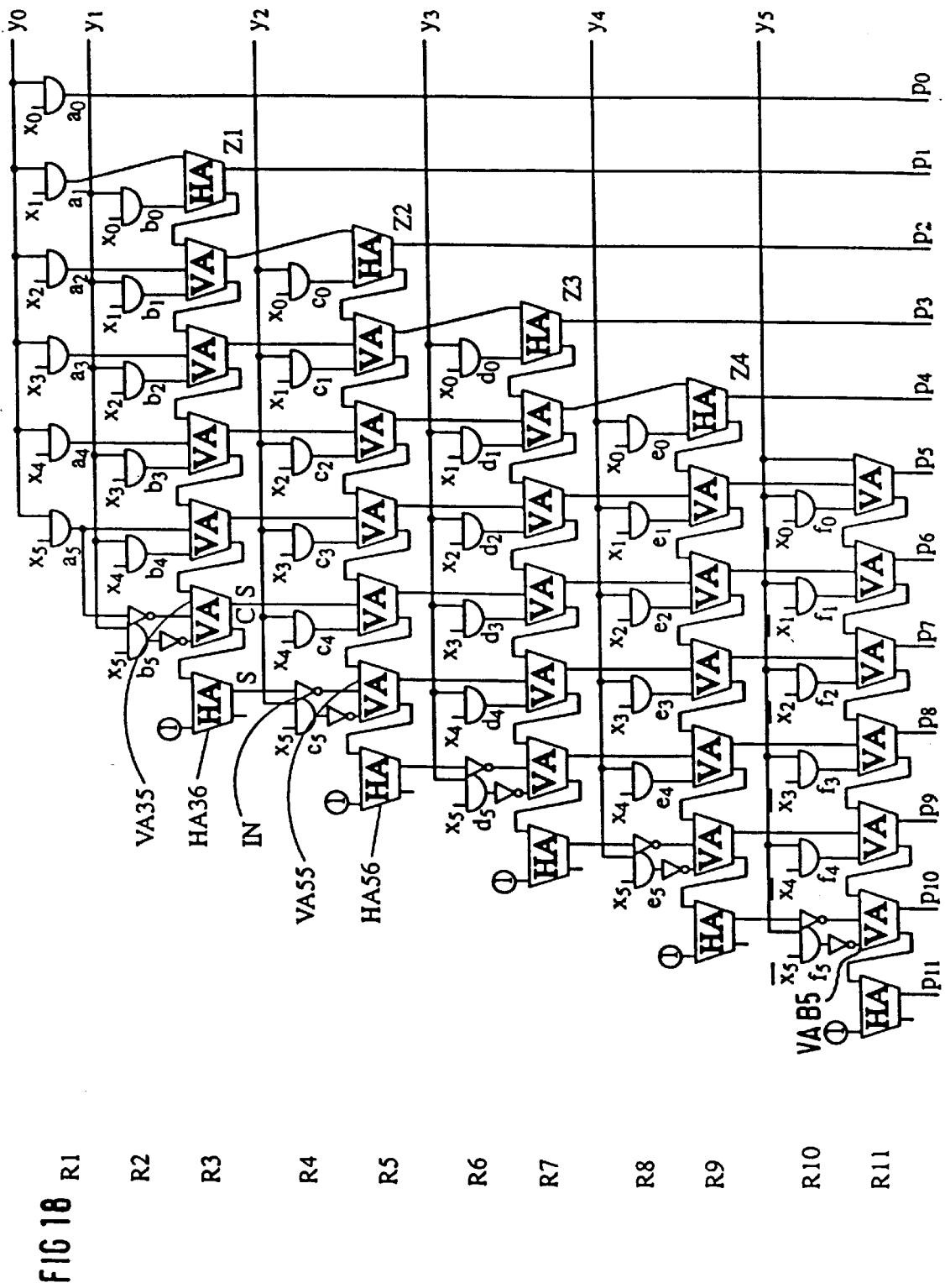
FIG. 18 shows a field multiplier according to the invention.

This simplification is carried out in FIG. 18, which shows the multiplier according to the invention. The sign bits fed to all the second-highest-order full adders VCA35 to VAB5 are inverted, and the highest-order full adders are replaced in each case by a half-adder HA36, HA56 . . . which is fed a constant one in addition to the carry bit. The bits S output by the half-adders at the sum output are—except for the highest-order 'sum bit' $P_{11}$ in particular—again inverted in the same way before combination with the sign bit of the next partial product.

The circuit arrangement can be further simplified in accordance with the logic function (13) of a half-adder by virtue of the fact that the series circuit of a half-adder with an inverter (FIG. 18) is eliminated in each case and replaced by a direct connection (only the inverters can also likewise be saved by feeding the half-adders a logic 0 instead of a 1).

Further transformations of the circuit are, of course, possible in accordance with the "Boolean rules".

Figure 19:
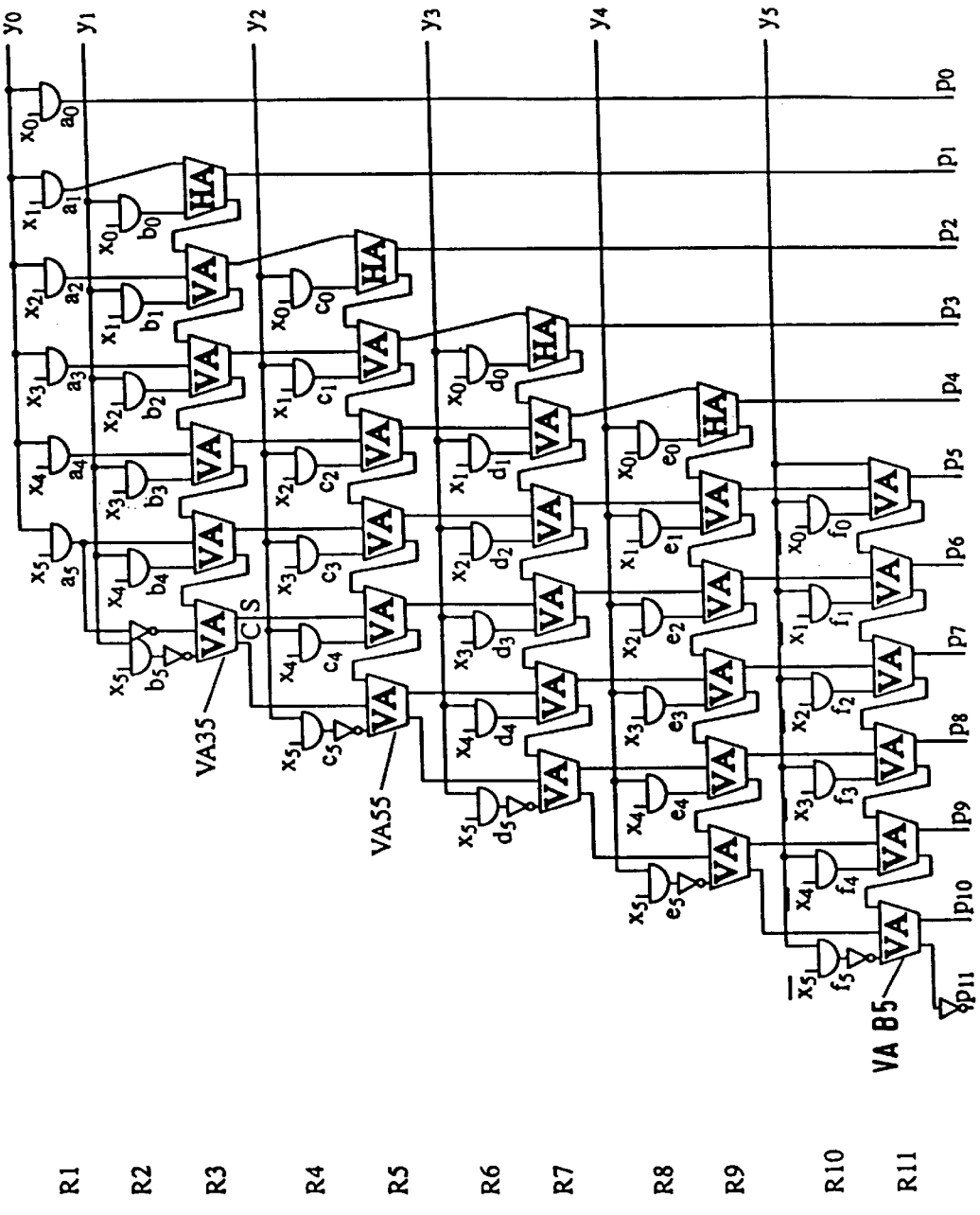
FIG. 19 shows an optimum embodiment of the field multiplier according to the invention.

FIG. 19 represents an optimized field multiplier in which in each adder row a saving has been made of a full adder by contrast with FIG. 17 or a half-adder by contrast with FIG. 18.

The bit output at the carry output of the full adder VAB5 must be inverted.

In the case of each binary digit processing sign bits, a carry bit of the lower-order full adder has to be added in each case in addition to the inverted sign bits or the fixed binary value (logic one) in the case of a circuit implementation using carry-ripple technology.

Figure 20:
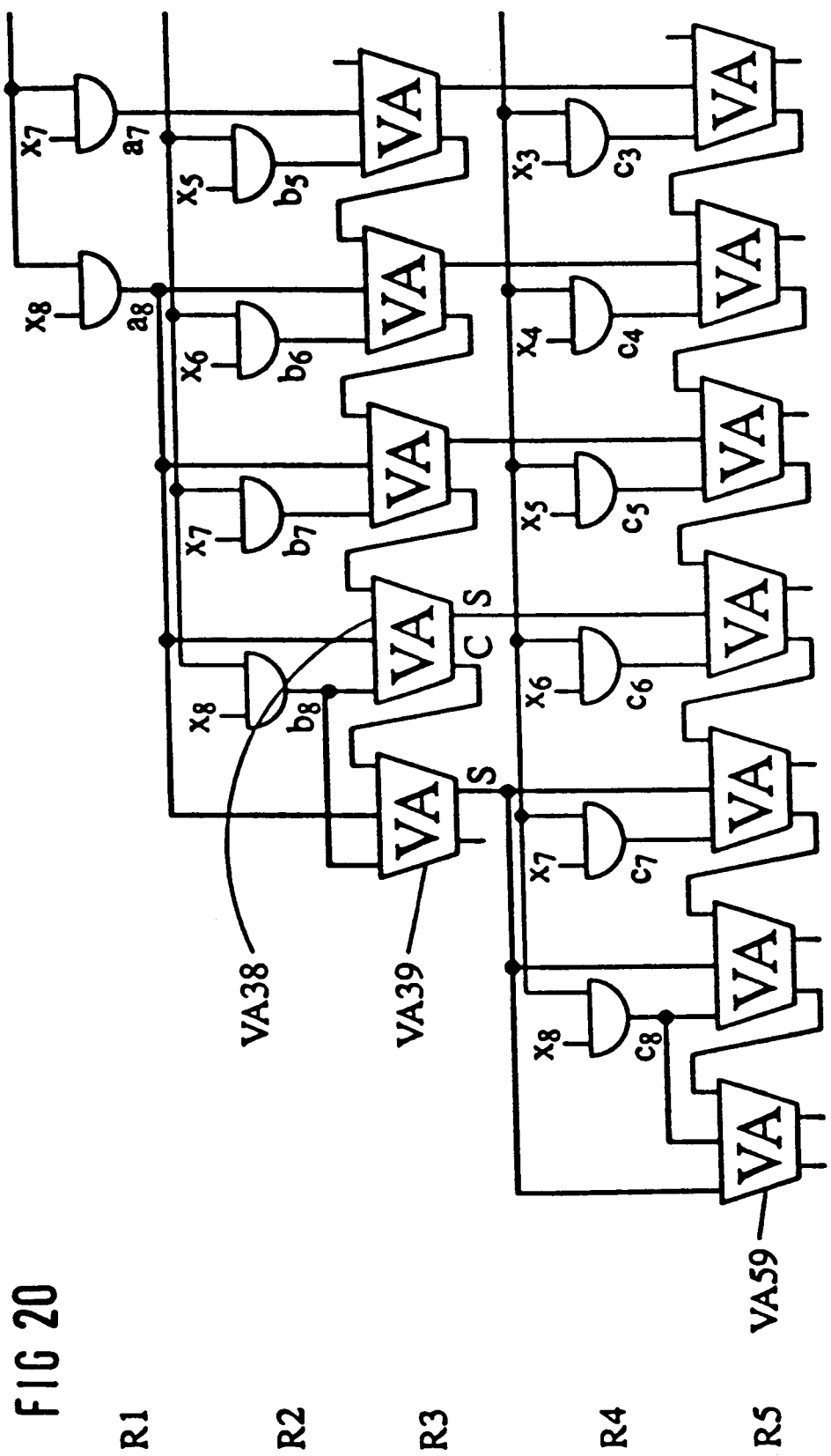
FIG. 20 shows a detail of a multiplier circuit.

A detail of a carry-ripple multiplier with a sign supplementation is represented in FIG. 20.

According to formula (24) or Table (27), the first adder row R3 is firstly converted, starting with the full adder VA38 to which both sign bits are fed.

This is followed by the replacement of the highest-order full adder VA39 (FIG. 20) in accordance with Table (27) by a half-adder HA39, to which a one is fed (FIG. 21) (The changed circuit corresponds to FIG. 18, since the two sign bits are likewise firstly respectively fed to the second-highest-order adder).

The circuit change implemented is now repeated for the next adder row by inverting the sign bits and replacing the highest-order full adder VA59 by a half-adder HA59. The highest-order half-adders are again in each case fed a one in addition to a carry bit.

Figure 21:
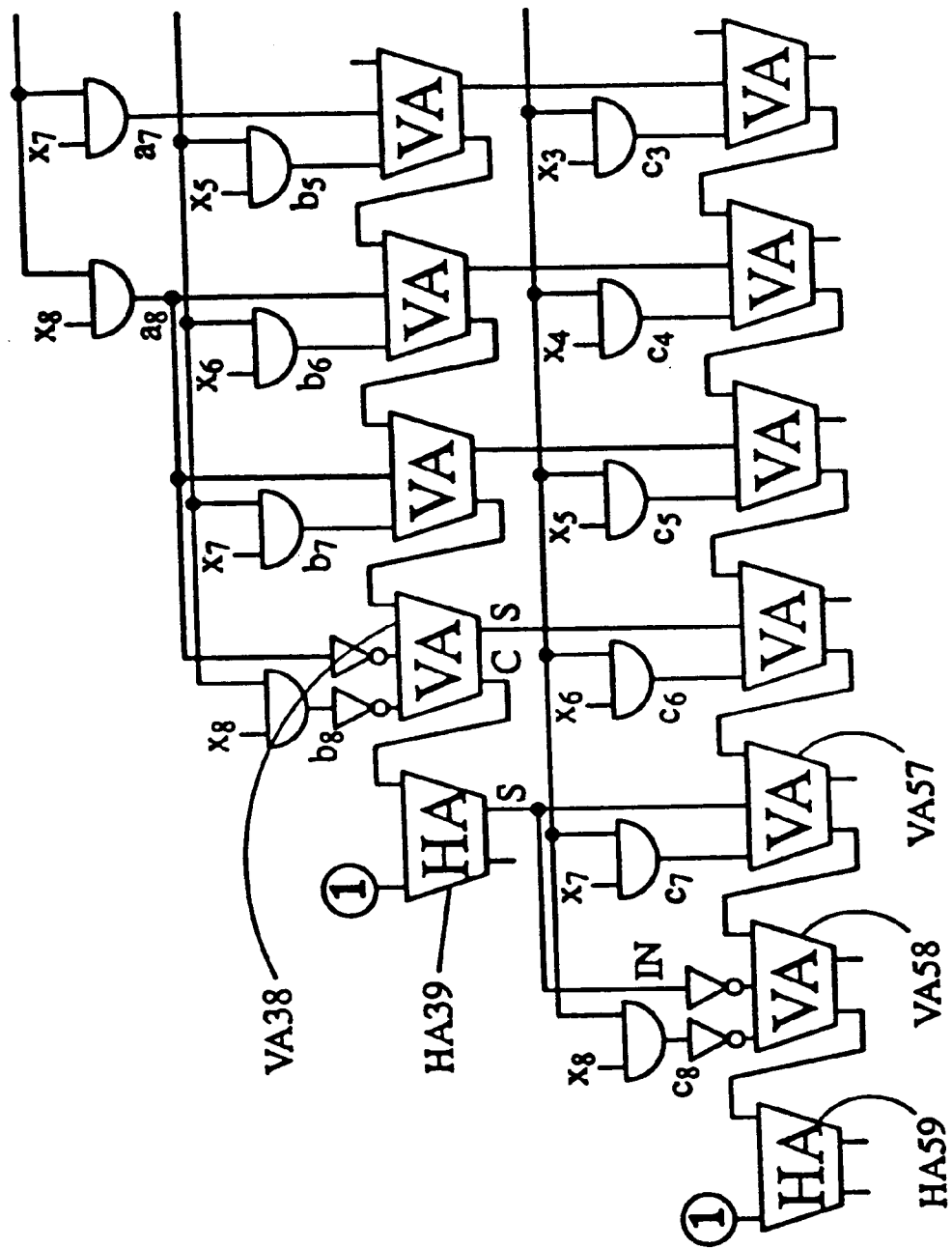
FIG. 21 shows a variant of this multiplier circuit corresponding to the invention and FIG. 22 shows the optimized embodiment of the latter.

The transformed adder rows are represented in FIG. 21.

The highest-order half-adder of each adder row can again be replaced in accordance with formula (18) by an inverter. The previously provided inverter IN is then eliminated, since the sign bit is inverted twice by the half-adder and the inverter; instead of this, a direct connection is provided (for example half-adder HA39 and inverter IN in the connection between the carry output of the full adder VA38 and an input of the highest-order full adder of the next adder row). An additional inverter is, by contrast, required between the carry output of the full adder VA38 and an input of the full adder VA57, etc.

Figure 22:
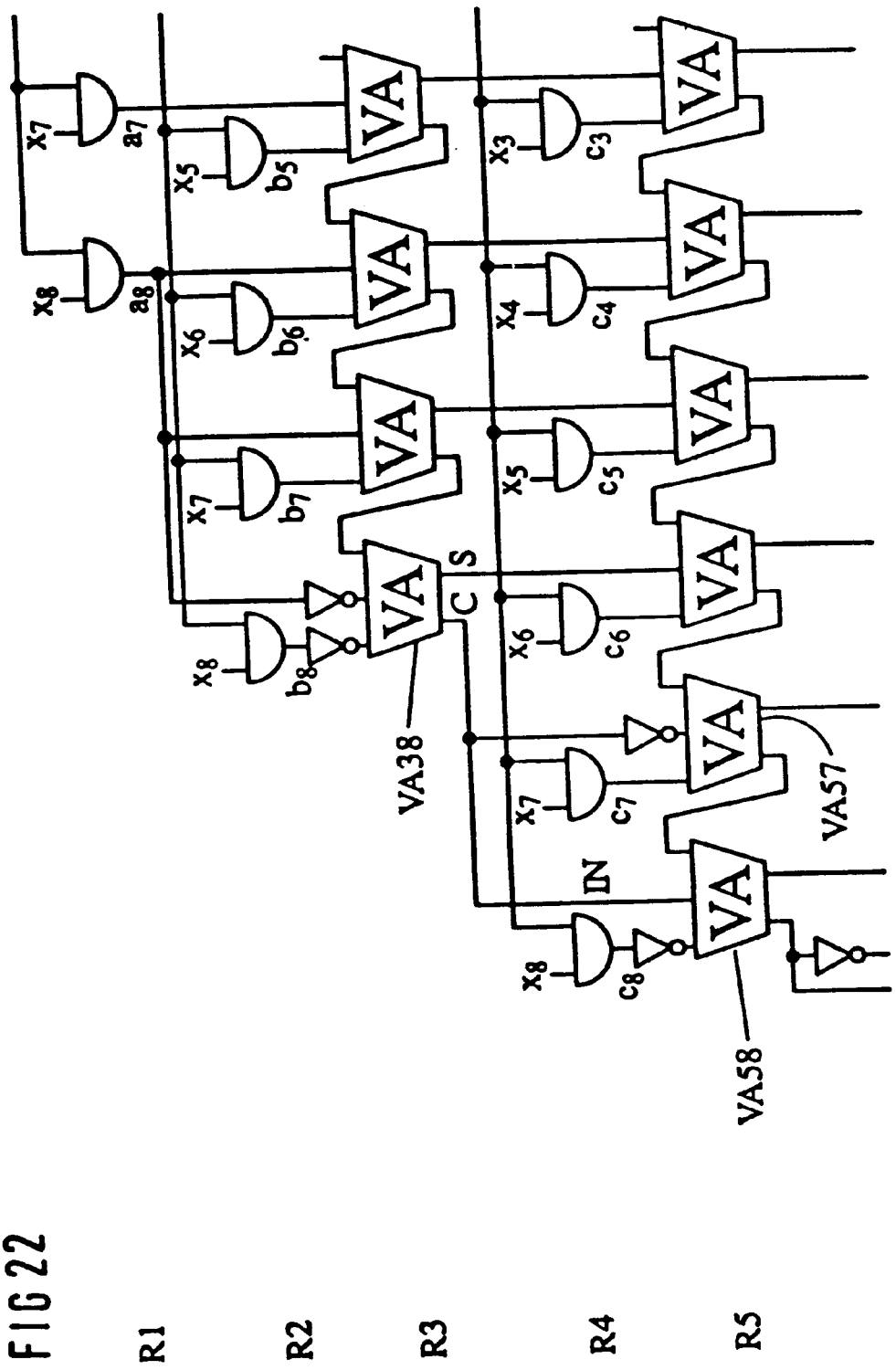

FIG. 22 shows the optimized circuit arrangement; the simplifications remain identical for sign supplementations of arbitrary size.

Of course, numerous 'Boolean transformations' are possible, starting with the replacement of the series circuit of an AND gate and an inverter by a NAND gate, the replacement thereof by an equivalent circuit with OR functions etc., up to processing of inverted signals.

It is known or conceivable in the case of all types of multipliers to calculate a plurality of partial product subtotals in parallel, which are then combined.

Although other modifications and changes may be suggested by those skilled in the art, it is the intention of the inventors to embody within the patent warranted hereon all changes and modifications as reasonably and properly come within the scope of their contribution to the art.

We claim:

1. A multiplier, comprising:
    a matrix shaped circuit of a plurality of multiplier rows for calculating partial products;
    a first adder row for adding partial products of a first and a second multiplier row of said plurality of multiplier rows, said first adder row including an adder to which is connected a sign bit of the first multiplier row that is inverted, said sign bit being supplemented by at least one bit, a constant one being added in said adder; said first adder row including higher order half adders, a constant one being added to each of said higher order half-adders of the first adder row; and
    additional adder rows for adding subtotals of the partial products calculated by the first adder row to partial products of one of said plurality of multiplier rows that follows next after said first adder row or for adding subtotals of the partial products calculated by another row of said additional adder rows to partial products of one of said plurality of multiplier rows that follows next after said another row of said additional adder rows.

2. A multiplier as claimed in claim 1, wherein said multiplier is a carry-save multiplier, having at least one adder row in which a sign bit of a partial product or of an intermediate result is supplemented in each case by at least one binary digit.

3. A multiplier as claimed in claim 2, wherein three partial products are combined by the first adder row.

4. A multiplier as claimed in claim 2, wherein highest-order adders of further adder rows are constructed as half-adders to which each one is fed in addition to the sign bit of a partial product.

5. A multiplier as claimed in claim 2, in a case of a sign bit supplementation, further comprising:
    a plurality of bits of a lowest-order full adder of the first adder row which combines two sign bits being fed the two sign bits as inverted sign bits, and
    higher-order adders of said first adder row being constructed as half-adders to which each is fed in addition to one of higher-order bits of a partial product.

6. A multiplier as claimed in claim 5, wherein corresponding highest-order adders of following adder rows are constructed as half-adders to which each of the highest-order bits of a further partial product and a one are fed.

7. A multiplier as claimed in claim 1, wherein said multiplier is a carry-ripple multiplier with at least one adder row in which a sign bit of a partial product or of a subtotal is each supplemented by at least one binary digit.

8. A multiplier as claimed in claim 7, wherein a highest-order adder of each adder row is constructed as a half-adder.

9. A multiplier as claimed in claim 7, wherein a sum output of a highest-order half-adder of an adder row is connected via an inverter to a second-highest-order adder, a full adder, of a next adder row, or a half-adder is provided with an inverting sum output.

10. A multiplier as claimed in claim 9, further comprising:
    a direct connection of a carry output of a second-highest-order full adder of a same adder row to an input of a second-highest-order full adder of a next adder row.

11. A multiplier as claimed in claim 7, wherein in a case of a sign bit supplementation, further comprising a plurality of bits, a sum output of a highest-order half-adder of an adder row being connected via respectively one inverter to a second-highest-order adder, a full adder, and directly to the input of at least one lower-order full adder of a following adder row.

12. A multiplier as claimed in claim 1, further comprising:
    a half-adder to which a one is fed in addition to a data bit to be processed is constructed as an inverter.

13. A multiplier as claimed in claim 12, wherein a carry output of a second-highest-order full adder of an adder row is additionally connected via an inverter, to each input of at least one lower-order full adder of a following adder row.

14. A multiplier as claimed in claim 1, further comprising:
a half-adder or an inverter to which two mutually inverse input signals are fed.

15. A multiplier as claimed in claim 1, wherein a highest-order partial product is calculated by inverting a multiplicand and a multiplication by a multiplier factor as well as addition of a sign bit.

16. A multiplier as claimed in claim 1, wherein an inverter or in addition an inverted bit is supplied to a cascaded adder of a following adder row.

17. A multiplier as claimed in claim 1, wherein said multiplier is connected to perform 'Boolean transformations'.

18. A multiplier as claimed in claim 1, wherein said multiplier is connected to operate as an adder.

19. A multiplier, comprising:

a matrix shaped circuit arrangement of a plurality of multiplier rows for calculating partial products;

a first adder row for adding partial products of at least a first and a second multiplier row of said plurality of multiplier rows, said first adder row including a full adder, sign bits of said first and second multiplier rows, which have to be supplemented by at least one bit, being fed inverted to said full adder of the first adder row; said first adder row including a highest order adder, said highest order adder being a half adder, a constant one being added to said highest order adder; and additional adder rows for adding subtotals of the partial products calculated by the first adder row to partial products of one of said plurality of multiplier rows that follows next after said first adder row or for adding subtotals of the partial products calculated by another row of said additional adder rows to partial products of one of said plurality of multiplier rows that follows next after said another row of said additional adder rows.

* * * * *